(12) United States Patent
Saeki et al.

(10) Patent No.: US 6,452,364 B1
(45) Date of Patent: Sep. 17, 2002

(54) BATTERY CHARGE CONTROL CIRCUIT, BATTERY CHARGING DEVICE, AND BATTERY CHARGE CONTROL METHOD

(75) Inventors: Mitsuo Saeki, Kawasaki (JP); Seiya Kitagawa, Yatsushiro (JP); Hidekiyo Ozawa, Kawasaki (JP); Toshiyuki Matsuyama, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/532,790

(22) Filed: Mar. 22, 2000

(30) Foreign Application Priority Data

Apr. 9, 1999 (JP) .............................. 11-103159

(51) Int. Cl.$^7$ ................................................ H02J 7/00
(52) U.S. Cl. ...................................... 320/137; 320/138
(58) Field of Search ............................... 320/137, 138, 320/125, 156, 162

(56) References Cited

U.S. PATENT DOCUMENTS

| | | | |
|---|---|---|---|
| 5,504,413 A | 4/1996 | Fernandez et al. | 320/163 |
| 5,532,935 A | 7/1996 | Ninomiya et al. | 307/31 |
| 5,698,964 A | 12/1997 | Kates et al. | 320/164 |
| 5,723,970 A | 3/1998 | Bell | 320/140 |
| 5,739,667 A | 4/1998 | Matsuda et al. | 320/128 |
| 5,900,717 A | * 5/1999 | Lee | 320/150 |
| 5,986,437 A | * 11/1999 | Lee | 320/162 |

FOREIGN PATENT DOCUMENTS

| | | |
|---|---|---|
| DK | 196 21 439 | 1/1997 |
| GB | 2 121 971 | 1/1984 |
| JP | 8-182219 | 7/1996 |
| JP | 8-186941 | 7/1996 |
| JP | 8-195224 | 7/1996 |
| JP | 10-51971 | 2/1998 |

* cited by examiner

Primary Examiner—Edward H. Tso
Assistant Examiner—Lawrence Luk
(74) Attorney, Agent, or Firm—Staas & Halsey LLP

(57) ABSTRACT

A battery charge control circuit, a battery charging device, and a battery charge control method for controlling the charging of a battery are provided. A power source supplies a current to a load, and a battery also supplies a current to the load. If the current supply capacity of the power source is restricted when the power source charges the battery, the charging of the battery is not stopped. Thus, a wrong operation can be avoided, and more reliable battery charging can be performed.

70 Claims, 26 Drawing Sheets

BATTERY CHARGE CONTROL CIRCUIT, BATTERY CHARGING DEVICE, AND BATTERY CHARGE CONTROL METHOD

BACKGROUND OF THE INVENTION

1. Field of the Invention

The present invention generally relates to a battery charge control circuit, a battery charging device, and a battery charge control method.

Charging a lithium-ion secondary battery is performed by a constant voltage/current control circuit, and the completion of the charging operation is normally determined when the charging current for the battery becomes smaller than a predetermined reference value.

In the case where completion of the charging operation is determined when the charging current value becomes smaller than the predetermined reference value, a charging device is expected to constantly supply a charging current larger than the predetermined reference value. However, when the battery is charged by a charger contained in an electronic device such as a notebook computer, only the difference between the power supply capacity of an AC adapter and the power consumption of the notebook computer is available to supply the charging current. In such a case, the charging current required by the battery is not always supplied to the battery.

When the charging current for the secondary battery becomes extremely small due to high power consumption by the notebook computer, a wrong determination that the charging operation has been completed is made. To avoid such an error, a charging constant voltage/current control circuit outputs a signal to determine whether the charging current is limited because the load of the electronic device is heavy or because the battery is actually fully charged.

In a portable electronic device such as a notebook computer, a battery is mounted as a power source for the electronic device. Generally, such a battery is a lithium battery in consideration of operating costs and instantaneously dischargeable current capacity. Also, a charger circuit is often contained in a portable electronic device, so that a secondary battery in the electronic device can be readily charged simply by connecting an AC adapter to the electronic device. For its portability, a portable electronic device normally has an internal secondary battery as a power source. However, when used on a desk, it might be supplied with power from an external power source such as an AC adapter.

A lithium secondary battery often used in notebook computers is charged at a constant voltage and/or a constant current. And the completion of the charging operation is normally determined when the charging current value becomes smaller than a predetermined reference value.

There are various techniques for charging a secondary battery by a charger contained in an electronic device such as a notebook computer. For example, the secondary battery is charged with power supplied from an external device such as an AC adapter, and the charging operation is performed whether or not the electronic device is in operation.

2. Description of the Related Art

FIG. 1 is a block diagram showing the structure of a conventional power supply unit for notebook (or lap-top, portable) computers.

An AC adapter 1 is connected to an AC power supply 2, and converts alternating current supplied from the AC power supply 2 into direct current. The AC adapter 1 is also connected to a power supply connector 3. The power supply connector 3 is in turn connected to a DC/DC converter 4 via a resistor R1 and a diode D1. The DC/DC converter 4 is connected to a secondary battery 5 via a diode D2, and converts DC power supplied from the AC adapter 1 or the secondary battery 5 into a predetermined DC voltage to be supplied to a load 6.

The secondary battery 5 is connected to a charger circuit 24 which comprises a voltage/current regulator 8, a differential amplifier 9, a voltage comparator 10, reference voltage supplies 12 to 14, and a microcomputer (or microprocessor) 11.

The voltage/current regulator 8 is a switching regulator-type DC/DC converter that operates in a PWM control system. The voltage/current regulator 8 comprises a switching transistor Tr1, a choke coil L1, a flywheel diode D3, a smoothing capacitor C1, a charging current detecting resistor R0, and a control unit 7.

The switching transistor Tr1 is formed by an FET, and is switched on and off by the control unit 7. The charging current detecting resistor R0 is a sense resistor which measures the value of current for charging the battery 5. A voltage drop caused by the current flowing through the sense resistor is inputted into the control unit 7. The switching transistor Tr1 is switched on and off to control current flowing through the choke coil L1. Thus, the voltage/current regulator 8 can perform DC/DC control.

Both ends of the charging current detecting resistor R0 are connected to the differential amplifier 9.

The non-inverting input terminal of the differential amplifier 9 is connected to the connection point between the charging current detecting resistor R0 and the battery 5, while the inserting input terminal of the differential amplifier 9 is connected to the connection point between the charging current detecting resistor R0 and the choke coil L1. The differential amplifier 9 amplifies voltages at both ends of the charging current detecting resistor R0. The output of the differential amplifier 9 is a voltage corresponding to the current supplied to the battery 5. The output of the differential amplifier 9 is supplied to the microcomputer 11.

The non-inverting input terminal of the voltage comparator 10 is connected to the AC adapter 1, and the inverting input terminal of the voltage comparator 10 is connected to the reference voltage supply 12. The voltage comparator 10 outputs a high-level signal or a low-level signal depending on the voltage of the AC adapter 1. More specifically, when the voltage generated from the AC adapter 1 is higher than a reference voltage supplied from the reference voltage supply 12, the voltage comparator 10 outputs a high-level signal. When the voltage generated from the AC adapter 1 is lower than the reference voltage supplied from the reference voltage supply 12, the voltage comparator 10 outputs a low-level signal. When the AC adapter 1 is connected to the charger circuit 24, the voltage comparator 10 outputs the high-level signal. When the AC adapter 1 is not connected, the voltage comparator 10 outputs the low-level signal. The output signals of the voltage comparator 10 are supplied to the microcomputer 11.

The microcomputer 11 controls the operation of the control unit 7 in accordance with the output signals of the differential amplifier 9 and the voltage comparator 10. When the output of the differential amplifier 9 is higher than a predetermined voltage, i.e., when the charging current is flowing, the microcomputer 11 determines that the battery 5 is not fully charged. When the output signal of the voltage comparator 10 is high, the microcomputer 11 determines that the AC adapter 1 is connected to the charger circuit 24.

After determining that the battery 5 and the AC adapter 1 are connected from the outputs of the differential amplifier 9 and the voltage comparator 10, the microcomputer 11 determines that the battery 5 can be charged, and supplies a control signal to the control unit 7 to switch on the control unit 7. When the output of the differential amplifier 9 is lower than the predetermined voltage, i.e., when the battery 5 is in a fully charged state, or when the output signal from the voltage comparator 10 is low, i.e., when the AC adapter 1 is not connected to the charger circuit 24, the microcomputer 11 determines that the battery 5 cannot be charged any more, and supplies a control signal to the control unit 7 to switch off the control unit 7.

Besides the control signals from the microcomputer 11, the control unit 7 receives the voltages from both ends of the resistor R1, the voltages from both ends of the charging current detecting resistor R0, and reference voltages. The control unit 7 is controlled in accordance with the control signals from the microcomputer 11, and switches on and off the switching transistor Tr1 in accordance with the voltages from both ends of the resistor R1, the voltages from both ends of the charging current detecting resistor R0, and the reference voltages.

The circuit shown in FIG. 1 charges the battery 5 by the charger circuit 24 while supplying power to the load 6. The input from the AC adapter 1 is supplied to the battery 5 through the charger circuit 24 as well as to the load 6 through the DC/DC converter 4. Accordingly, the load 6 consumes power while the battery 5 is charged.

FIG. 2 is a block diagram of the control unit of the conventional power supply unit.

The control unit 7 comprises differential amplifiers 15 and 16, error amplifiers 17 to 19, a triangular wave oscillator 20, a PWM comparator 21 and a driver 22.

The differential amplifier 15 detects the voltages at both ends of the resistor R1. The output of the differential amplifier 15 turns into a signal corresponding to the current flowing through the resistor R1, i.e., to the output current of the AC adapter 1.

The differential amplifier 16 detects the voltages at both ends of the charging current detecting resistor R0. The output of the differential amplifier 16 turns into a signal corresponding to the current flowing through the charging current detecting resistor R0, i.e., to the charging current for charging the battery 5.

The output detection signal from the differential amplifier 15 is supplied to the inverting input terminal of the error amplifier 17. A reference voltage Vref1 from a reference voltage supply 13 is applied to the non-inverting input terminal of the error amplifier 17. The error amplifier 17 in turn outputs a signal corresponding to the difference between the output from the differential amplifier 15 and the reference voltage Vref1. The reference voltage Vref1 is set in accordance with the maximum current supplied from the AC adapter 1.

The output detection signal from the differential amplifier 16 is supplied to the non-inverting input terminal of the error amplifier 18. A reference voltage Vref2 from a reference voltage supply 14 is applied to the inverting input terminal of the error amplifier 18. The error amplifier 18 in turn outputs a signal corresponding to the difference between the output from the differential amplifier 16 and the reference voltage Vref2.

The inverting input terminal of the error amplifier 19 is connected to the connection point between the charging current detecting resistor R0 and the battery 5, and the non-inverting input terminal is connected to a reference voltage supply 23. The error amplifier 19 outputs the difference between the reference voltage Vref3 from the reference voltage supply 23 and the charging voltage for the battery 5 at the connection point between the charging current detecting resistor R0 and the battery 5. The output of the error amplifier 19 is supplied to the PWM comparator 21. The reference voltage Vref3 is set in accordance with the maximum voltage applicable to the battery 5.

The triangular wave oscillator 20 outputs a signal whose output level shows a saw-tooth waveform. The signal generated from the triangular wave oscillator 20 is supplied to the PWM comparator 21.

The PWM comparator 21 compares the respective outputs of the error amplifiers 17 to 19 with the saw-tooth wave signal generated from the triangular wave oscillator 20. In accordance with the comparison results, the PWM comparator 21 generates a high-level signal or a low-level signal, and outputs a pulse according to the AND logic. The output pulse of the PWM comparator 21 is supplied to the driver 22. In accordance with the output pulse, the driver 22 switches on and off the switching transistor TR1.

FIG. 3A shows a triangular waveform of the outputs of the error amplifiers 17 to 19. FIG. 3B shows the switching state of the switching transistor Tr1.

As shown in FIG. 3A, the PWM comparator 21 compares the minimum voltage level among the outputs of the error amplifiers 17 to 19 with the saw-tooth wave supplied from the triangular wave oscillator 20. When the minimum voltage level among the outputs of the error amplifiers 17 to 19 is higher than the saw-tooth wave supplied from the triangular wave oscillator 20, the switching transistor Tr1 is switched on, as shown in FIG. 3B. The switching transistor Tr1 is switched off during the other periods.

Being switched on and off, the switching transistor Tr1 outputs a pulse-type current. The current outputted from the switching transistor Tr1 is rectified by the rectifier circuit, and is supplied to the battery 5. The voltage and current supplied to the battery 5 here is controlled by the ON/OFF periods of the switching transistor Tr1. Such a control operation is called "PWM control".

The error amplifier 17 shown in FIG. 2 amplifies the difference between the output of the differential amplifier 15 and DC-CURR (the reference voltage Vref1) supplied from the reference voltage supply 13 shown in FIG. 1. As mentioned before, the DC-CURR (the reference voltage Vref1) supplied from the reference voltage 13 shown in FIG. 1 is set in accordance with the maximum current value the AC adapter 1 can supply. Accordingly, the output of the error amplifier 17 activates the driver 22 through the PWM comparator 21, so that the sum of the currents that the AC adapter 1 supplies to the load 6 and the battery 5 equals the maximum current the AC adapter 1 can supply.

While the power is supplied from the AC adapter 1 to the load 6, the error amplifier 17 increases and decreases the charging current for the battery 5 as the power consumption by the load 6 increases and decreases. By doing so, the error amplifier 17 controls the charging current so that the sum of the current consumed by the load 6 and the charging current for the battery 5 equals the maximum power capacity of the AC adapter 1. For instance, when the current consumption of the load 6 increases, the current flowing through the sense resistor R1 also increases. As the current flowing through the sense resistor R1 increases, the output of the differential amplifier 15 becomes larger. As the output of the error amplifier 15 becomes larger, the difference between the output of the error amplifier 15 and the DC-CURR (the reference voltage Vref1) supplied from the reference voltage supply 13 becomes small, and so does the output of the error amplifier 17. When the output of the error amplifier 17 becomes smaller than the outputs of the error amplifiers 18 and 19, the PWM comparator 1 compares the output of the error amplifier 17 with the output of the triangular wave oscillator 20. In accordance with the comparison result between the outputs of the error amplifier 17 and the triangular wave oscillator 20, the PWM comparator 21 drives the driver 22.

When the current consumption of the load 6 increases, the output of the error amplifier 17 is smaller than the outputs of the error amplifiers 18 and 19. Accordingly, the error amplifier 17 is controlled to restrict the charging current for the battery 5.

The output of the differential amplifier 16 corresponding to the current flowing through the sense resistor R0 shown in FIG. 1 and the reference voltage Vref2 (BAT CURR) outputted from the reference voltage supply 14 define the maximum charging current that can be applied to the battery 5. Accordingly, the output of the error amplifier 18 serves to maintain the charging current for the battery 5 at a predetermined current value.

The error amplifier 19 amplifies the difference between the charging voltage ERR2 for the battery 5 and the reference voltage Vref3 generated from the reference voltage supply 23. The reference voltage Vref3 generated from the reference voltage supply 23 is set in accordance with the maximum voltage that can be applied to the battery 5. Accordingly, the output of the error amplifier 19 serves to activate the driver 22 so that the battery 5 has the maximum voltage level.

As mentioned before, the outputs of the error amplifiers 17 to 19 are inputted into the non-inverting input terminal of the PWM comparator 21. The minimum voltage level of the error amplifiers 17 to 19 is used to control the switching transistor Tr1. More specifically, when the output of the error amplifier 18 is at the minimum voltage level, the switching transistor Tr1 is switched on and off so as to turn the power to be supplied to the battery 5 into a constant current. In the field of DC/DC conversion, a circuit for controlling a charging current so as to be a constant current is called a current regulator, a constant-current control circuit, or a constant-current charger control circuit. This constant-current charging will be described later in detail, with reference to FIG. 5.

When the output of the error amplifier 19 is at the maximum voltage level, the voltage to be applied to the battery 5 is a constant voltage. Accordingly, the circuit for turning the charging voltage into a constant voltage is called a constant-voltage circuit, a voltage regulator, a constant-voltage control circuit, or a constant-voltage charger control circuit. This constant-voltage charging will be described later in detail, with reference to FIG. 5.

A circuit having both a current regulator and a voltage regulator or both functions of a current regulator and a voltage regulator is called a constant voltage/current control circuit or a voltage/current regulator.

FIG. 4 is a flowchart of an operation of the microcomputer of a conventional power supply unit.

First in step S1-1, the microcomputer 11 determines whether all charge starting conditions are satisfied or not. The charge starting conditions that represented by voltages are: that the AC adapter 1 is supplying a voltage, that the battery 5 is connected, and that the battery 5 is not full.

When the output of the voltage comparator 10 is high, the microcomputer 11 determines that a voltage is supplied from the AC adapter 1. By detecting whether the output of the differential amplifier 9 is higher than a predetermined level or not, the microcomputer 11 determines whether the battery 5 is fully charged or not. When the battery 5 is not fully charged, a current flows through the charging current detecting resistor R0, generating voltages at both ends of the charging current detecting resistor R0, and making the output of the differential amplifier 9 higher than the predetermined level.

When all the charge starting conditions are satisfied, the microcomputer switches on the control unit 7 in step S1-2. In accordance with the voltages at both ends of the resistor R1 and the charging current detecting resistor R0, the control unit 7 performs PWM control on the current to be supplied to the battery 5.

In step S1-3, the microcomputer 11 determines whether the charging current becomes lower than a predetermined value during the charging. This determination is made based on the output signal from the differential amplifier 9. When the charging current becomes lower than a predetermined value, the voltages at both ends of the charging current detecting resistor R0 drop, and the output of the differential amplifier 9 becomes small. Thus, whether the charging current is lower than the predetermined value can be determined from the output of the differential amplifier 9.

If the charging current is determined not to be smaller than the predetermined value in the step S1-3, the charging is continued. If the charging current is determined to be smaller than the predetermined value in the step S1-3, the 93 microcomputer 11 determines that the charging of the battery 5 has been completed, and stops the operation of the control unit 7, thereby stopping the charging of the battery 5.

FIG. 5A shows the charging voltage characteristics of the battery 5, and FIG. 5B shows the charging current characteristics of the battery 5.

As shown in FIG. 5A, if the battery 5 is in a constant-voltage state at time t1, the charging current I decreases after the time t1 as shown in FIG. 5B. When the charging current I reaches a predetermined level I0 at time t2, as shown in FIG. 5B, the microcomputer 11 stops the operation of the control unit 7, thereby stopping the charging of the battery 5.

More specifically, when the current flowing through the load 6 is not large, the control unit 7 controls the charging by the output of either the error amplifier 18 or the error amplifier 19, because the output of the error amplifier 17 does not become the smallest one among the three error amplifiers 17 to 19. In FIGS. 5A and 5B, at the start of charging the battery 5 (a lithium battery, specifically), the output of the error amplifier 18 is smaller than the other positive inputs. Therefore, the control unit 7 controls the charging current so that the battery 5 is charged with a constant current until the time t1, as shown in FIG. 5B. Accordingly, in the initial stage of charging, the error amplifier 18 provides the battery 5 with a current having a value corresponding to the reference voltage Vref2 generated from the reference voltage supply 14.

As shown in FIG. 5A, when the voltages rises to a predetermined voltage at the time t1, the output voltage of the error amplifier 19 shown in FIG. 2 becomes the lowest, and the charging is controlled with the output of the error amplifier 19. After the time t1, the voltage to be applied to the battery 5 is controlled to be a constant voltage. As mentioned before, the charging current gradually decreases after the time t1.

It should be noted that Japanese Laid-Open Patent Application No. 8-182219 discloses a battery charge control circuit having the above structure.

In the conventional charger circuit, however, the switching transistor Tr1 is controlled by the control unit 7 in accordance with the voltage of the AC adapter 1 and the current to be supplied to the battery 5. When the current demanded by the load 6 increases and exceeds the current supply capacity of the AC adapter 1, most of the output current of the AC adapter 1 is supplied to the load 6 through the resistor R1, the diode D1, and the DC/DC converter 4, even though the battery 5 is not fully charged.

The AC adapter is connected to the battery 5 as well as to the load 6. The battery 5 can be charged even when the load 6 is on (i.e., when the load 6 consumes power). Accordingly, the AC adapter 1 charges the battery 5 and supplies the load 6 with power at the same time. When the power consumption of the load 6 is not very large, the battery 5 is charged in accordance with the charging characteristic shown in FIGS. 5A and 5B. If the power consumption of the load 6 becomes larger than the current supply capacity of the AC adapter 1, the switching transistor Tr1 is controlled in accordance with the output of the error amplifier 17 shown in FIG. 2, and the charger 6 is supplied with less and less current. This is because the error amplifier 17 drives the driver 22 via the PWM comparator 21, so that the sum of the currents to be supplied to the load 6 and the battery 5 equals the maximum supply current of the AC adapter 1. Accordingly, while the load 6 is supplied with the power from the AC adapter 1, the error amplifier 17 supplies current to the load 6 in accordance with the power consumption of the load 6. Accordingly, if the power consumption of the load 6 becomes equal to the maximum supply current of the AC adapter 1, the charger circuit 6 receives no current at all, and no current flows through the charging current detecting resistor R0. As no current flows through the charging current detecting resistor R0, the voltage of the charging current detecting resistor R0 drops. When the voltage of the charging current detecting resistor R0 drops, the microcomputer 11 determines that the charging of the battery 5 has been completed, and stops the operation of the control unit 7.

The above wrong determination is likely to occur when the capacity of the AC adapter is not sufficiently large.

In a case where a plurality of secondary batteries are mounted in an electronic device such as a notebook computer, one charger circuit charges the plurality of secondary batteries connected in parallel. In such a parallel charging operation, more charging current flows into batteries having less power left than the other batteries, while less or no charging current flows into the other batteries having more power left. If one of the batteries has only an extremely small amount of power left, the remaining batteries might be supplied with no power at all. With no power being supplied, the microcomputer might wrongly determine that the charging has been completed.

As described above, the conventional charger circuit has the problem that the operation of the control unit 7 is stopped even though the battery 5 is not fully charged.

Also, as mentioned before, when a battery is charged by a charger for an electronic device such as a notebook computer, the required amount of current may not always be supplied to the secondary battery, in an attempt to perform the charging in a shortest possible period of time. If the electronic device requires a large amount of power to operate, the charging current to be supplied to the secondary battery becomes very small. As a result, the wrong determination that the charging of the secondary battery has been completed will be made.

SUMMARY OF THE INVENTION

A general object of the present invention is to provide battery charge control circuits, battery charging devices, and battery charge control methods, in which the above disadvantages are eliminated.

A more specific object of the present invention is to provide a battery charge control method, in which a wrong determination as to whether the charging of a battery has been completed can be prevented. Another specific object of the present invention is to provide a battery charge control circuit, a battery charging device, and a battery charge control method, in which wrong operations of a charger circuit can be prevented.

The above objects of the present invention are achieved by a battery charge control circuit, which has a restricted state notifying unit which detects a restriction on the supply capacity of a power source, and outputs a notification that the supply capacity of the power source is restricted.

With the above structure, a wrong determination as to whether the charging of a battery has been completed can be prevented, in a case where the supply capacity of the power source is restricted, a current is supplied to a load, and the charging current for the battery decreases accordingly.

The above objects of the present invention are also achieved by a battery charge control circuit, which includes a first control circuit for controlling the charging current for the battery so that the battery can be charged in accordance with predetermined charging conditions, and a second control circuit for controlling the charging current so that the power demanded from the power source does not exceed the capacity of the power source. In this battery charge control circuit, a notification when the charging current is being controlled by the second control circuit is outputted.

With the above structure, it can be determined that the supply capacity of the power source is restricted when the charging current is controlled by the second control circuit. Thus, no mistaken determination that the charging of the battery has been completed will be made when a current is supplied to a load and the charging current for the battery decreases accordingly.

The above objects of the present invention are also achieved by a battery charging device, which has a restricted state notifying unit which detects a restriction on the supply capacity of a power source, and outputs a notification that the supply capacity of the power source is restricted. The battery charging device may includes a first control circuit which controls the charging current of the battery so that the battery is charged in accordance with predetermined charging conditions, and a second control circuit which controls the charging current so that the power demanded from the power source does not exceed the capacity of the power source. In this battery charging device, the restricted state notifying unit outputs a notification that the charging current is controlled by the second control circuit.

The above objects of the present invention are also achieved by a battery charge control method comprising the steps of: detecting a restriction on the supply capacity of a power source which supplies current to a load and charges a battery part; and continuing the charging of the battery part when the supply capacity of the power source is restricted.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 6:
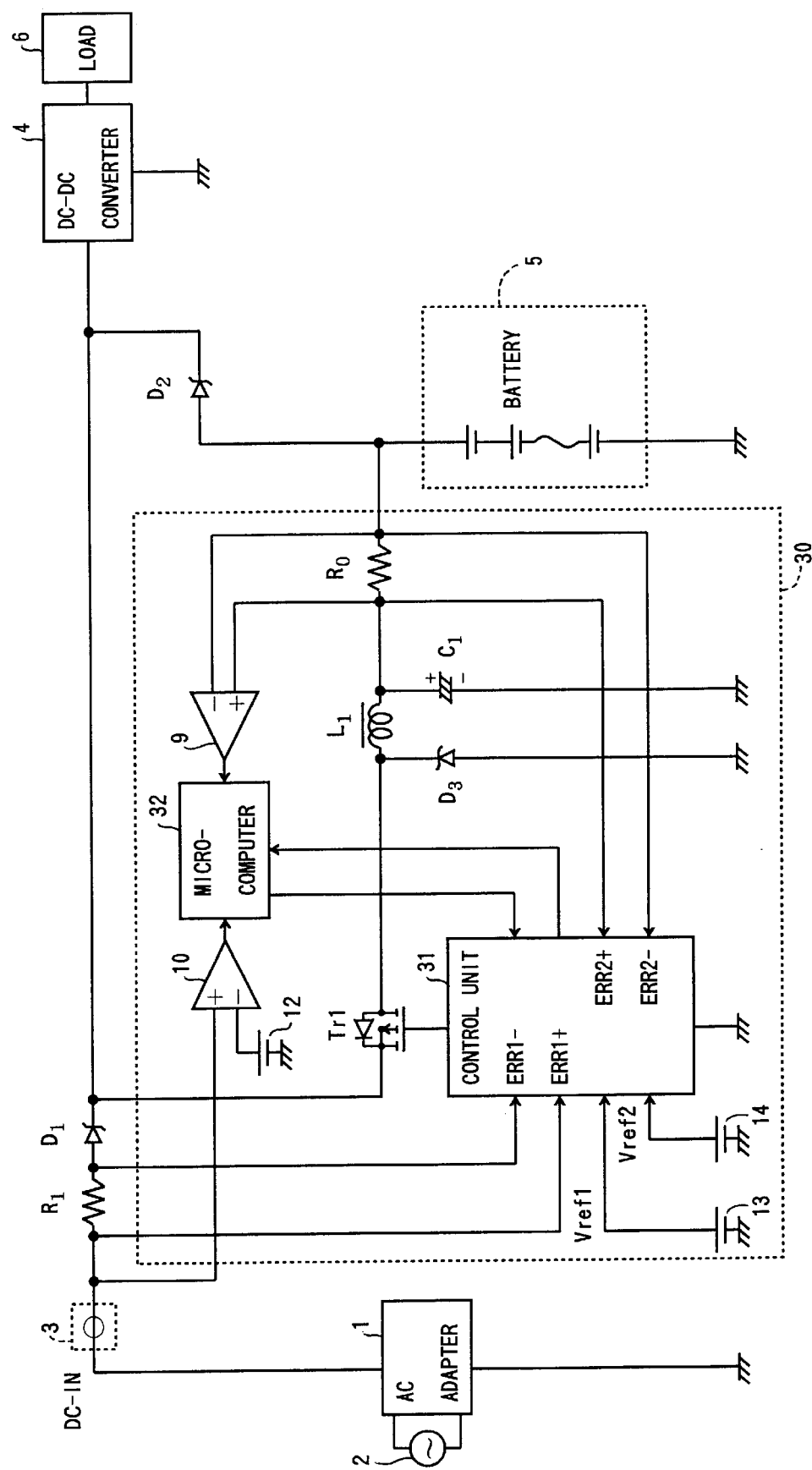
FIG. 6 is a block diagram of a first embodiment of a power supply unit of the present invention.

FIG. 6 is a block diagram showing a first embodiment of the present invention. In this drawing, the same components as in FIG. 1 are denoted by the same reference numerals.

Figure 1:
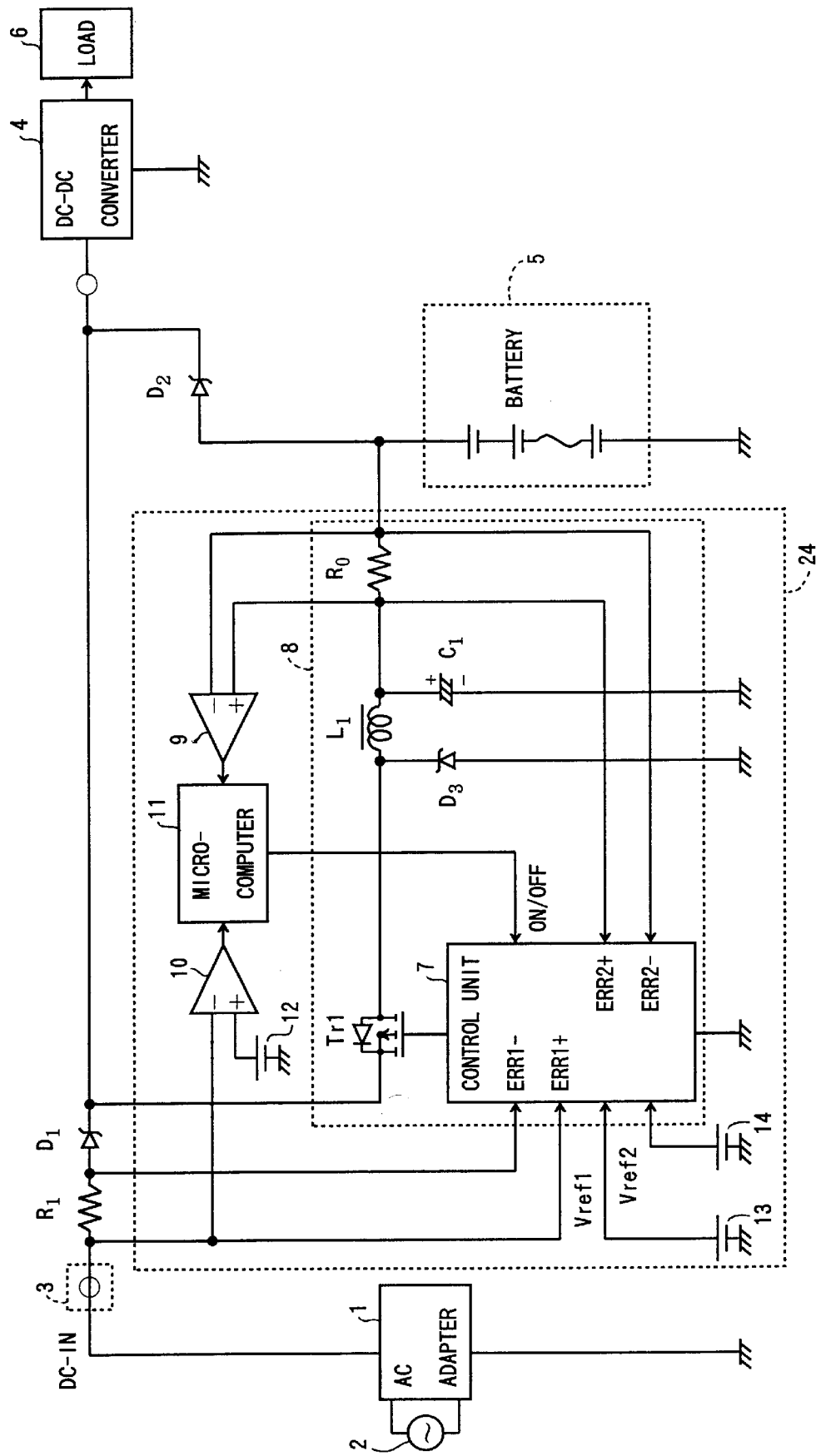
FIG. 1 is a block diagram of an example structure of the prior art.

This embodiment differs from the structure shown in FIG. 1 in the charger circuit. More specifically, the different features of the charger circuit 30 of this embodiment from the charger circuit 24 of FIG. 1 are the structure of a control unit 31 which constitutes a voltage/current regulator together with the switching transistor Tr1, the choke coil L1, the diode D3, the capacitor C1, and the charging current detection resister R0, and the operation of a microcomputer 32.

The control unit 31 of this embodiment outputs a discriminating signal for determining which factor restricts the charging current. The discriminating signal is generated based on the output current of the AC adapter 1, the charging current for the battery 5, and the charging voltage for the battery 5. From the discriminating signal, it can be determined whether the charging current for the battery 5 is restricted due to an increase in current consumption of the load 6 or in accordance with a result of detection carried out by the charger circuit 30. The microcomputer 32 controls the operation of the control unit 31 in accordance with the discriminating signal from the control unit 31.

Figure 2:
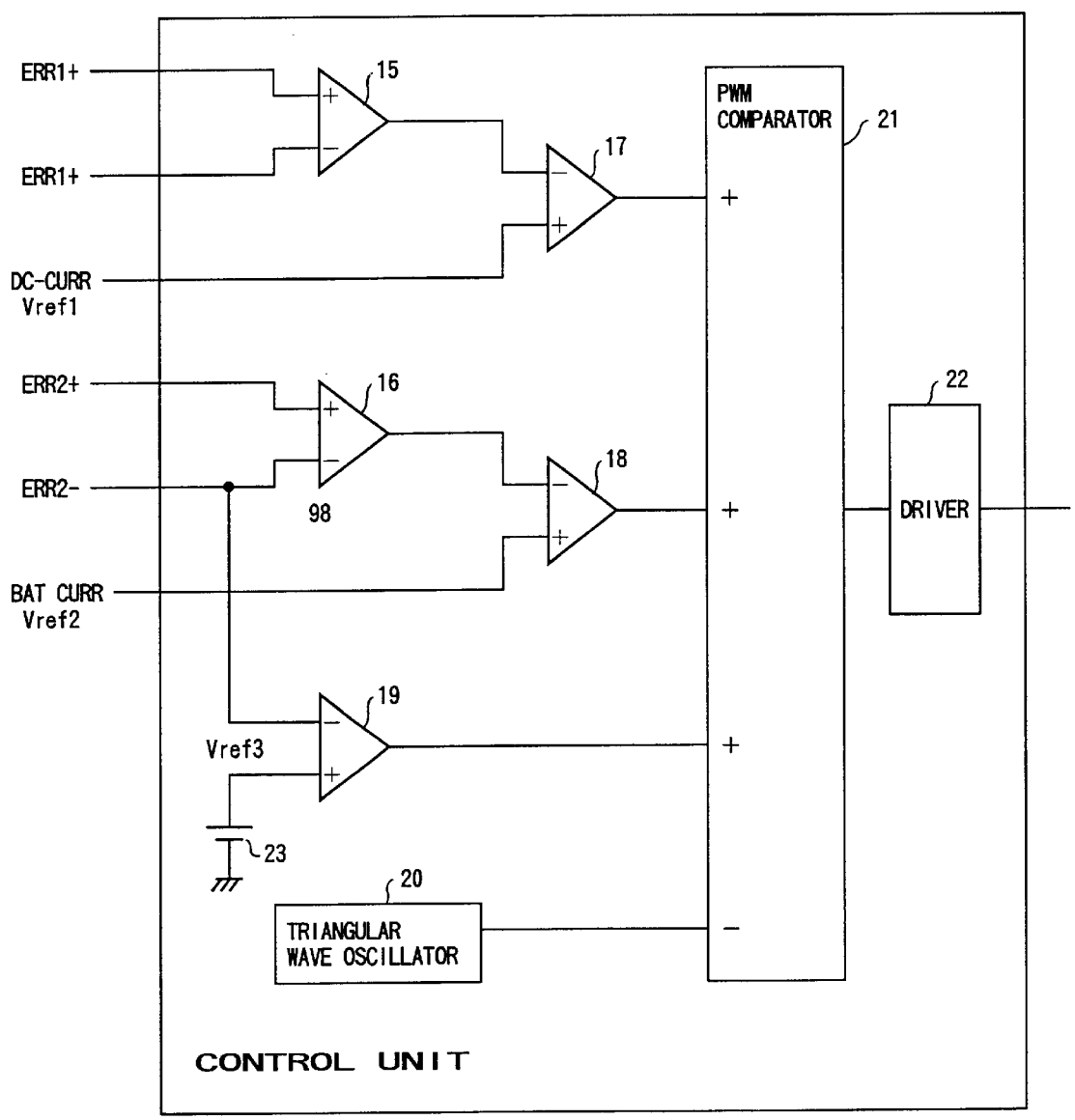
FIG. 2 is a block diagram of a control unit of the example structure of the prior art.
Figures 3A, 3B:
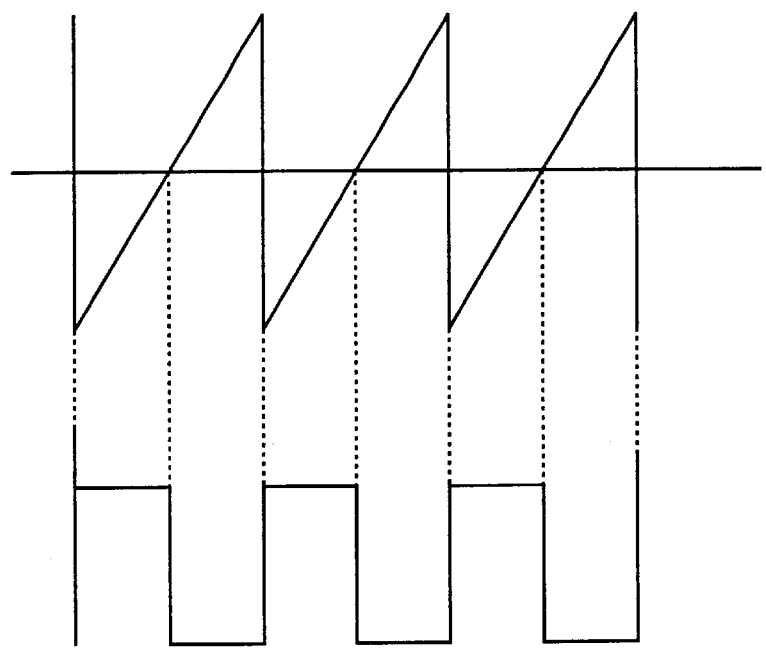
FIGS. 3A shows a waveform of each output of error amplifiers of the example structure of the prior art.
FIG. 3B shows a switching state of a switching transistor of the example structure of the prior art.
Figure 7:
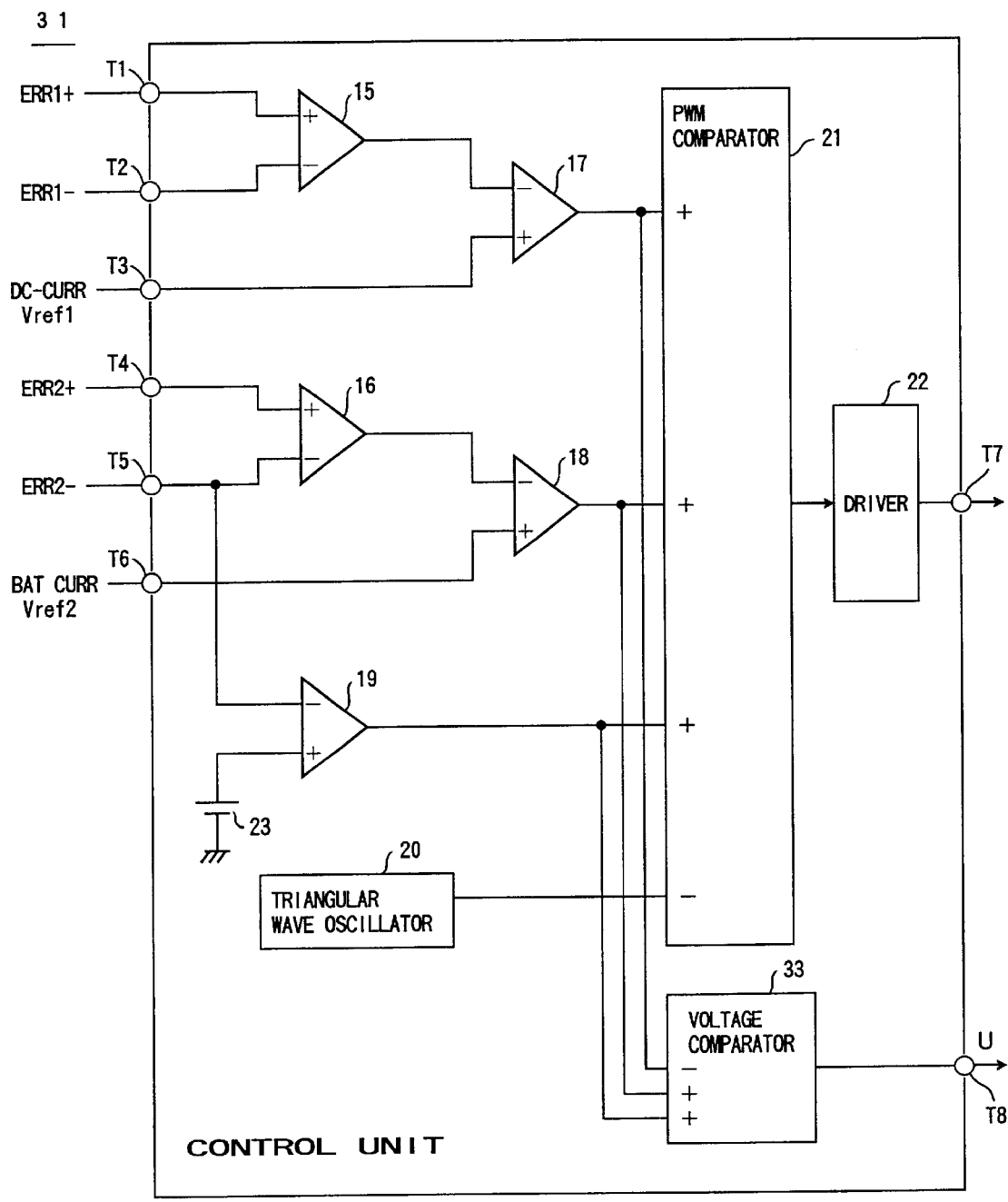
FIG. 7 is a block diagram of a control unit of the first embodiment of the present invention.

FIG. 7 is a block diagram of the control unit of the first embodiment of the present invention. In this figure, the same components as in FIG. 2 are denoted by the same reference numerals.

The control unit 31 has a voltage comparator 33 which compares the output of the error amplifier 17 with the outputs of the error amplifiers 18 and 19. This control unit 31 is the IC of one chip, for instance, and has input terminals T1 to T6 and output terminals T7 and T8. The input terminal T1 is connected to the connection point between the resistor R1 and the power supply connector 3 outside the control unit 31, while being connected to the non-inverting input terminal of the differential amplifier 15 inside the control unit 31. The input terminal T2 is connected to the connection point between the resistor R1 and the diode D1 outside the control unit 31, while being connected to the inverting input terminal of the differential amplifier 15 inside the control unit 31.

The input terminal T3 is connected to the reference voltage supply 13 outside the control unit 31, while being connected to the non-inverting input terminal of the error amplifier 17 inside the control unit 31. The input terminal T4 is connected to the connection point between the choke coil L1 and the charging current detecting resistor R0 outside the control unit 31, while being connected to the non-inverting input terminal of the differential amplifier 16 inside the control unit 31.

The input terminal T5 is connected to the connection point between the charging current detecting resistor R0 and the battery 5 outside the control unit 31, while being connected to the inverting input terminals of the differential amplifier 16 and the error amplifier 19 inside the control unit 31. The input terminal T6 is connected to the reference voltage supply 14 outside the control unit 31, while being connected to the non-inverting input terminal of the error amplifier 18 inside the control unit 31.

The output terminal T7 is connected to the microcomputer 32 outside the control unit 31, while being connected to the driver 22 inside the control unit 31. The output terminal T8 is connected to the microcomputer 32 outside the control unit 31, while being connected to the voltage comparator 33 inside the control unit 31.

The voltage comparator 33 is a three-input comparator. The output of the error amplifier 17 is supplied to the non-inverting terminal of the voltage comparator 33, and the outputs of the error amplifiers 18 and 19 are supplied to the non-inverting input terminals of the voltage comparator 33. The voltage comparator 33 compares the outputs of the error amplifiers 18 and 19 with the output of the error amplifier 17. The voltage comparator 33 outputs a signal which is high when either of the outputs of the error amplifiers 18 and 19 is larger than the output of the error amplifier 17, and which is low when the outputs of the error amplifiers 18 and 19 are both smaller than the output of the error amplifier 17. Accordingly, when the output of the voltage comparator 33 is high, the PWM comparator 21 is controlled by the output current of the AC adapter 1. When the output of the voltage comparator 33 is low, the PWM comparator 21 is controlled in accordance with the state of the battery 5.

When the output signal from the voltage comparator 33 is low, the microcomputer 32 switches on and off the control unit 31 in accordance with the outputs of the differential amplifier 9 and the voltage comparator 10. When the output signal from the voltage comparator 33 is high, the microcomputer 32 maintains the control unit 31 in the switched-on state, regardless of the outputs of the differential amplifier 9 and the voltage comparator 10.

Figure 8:
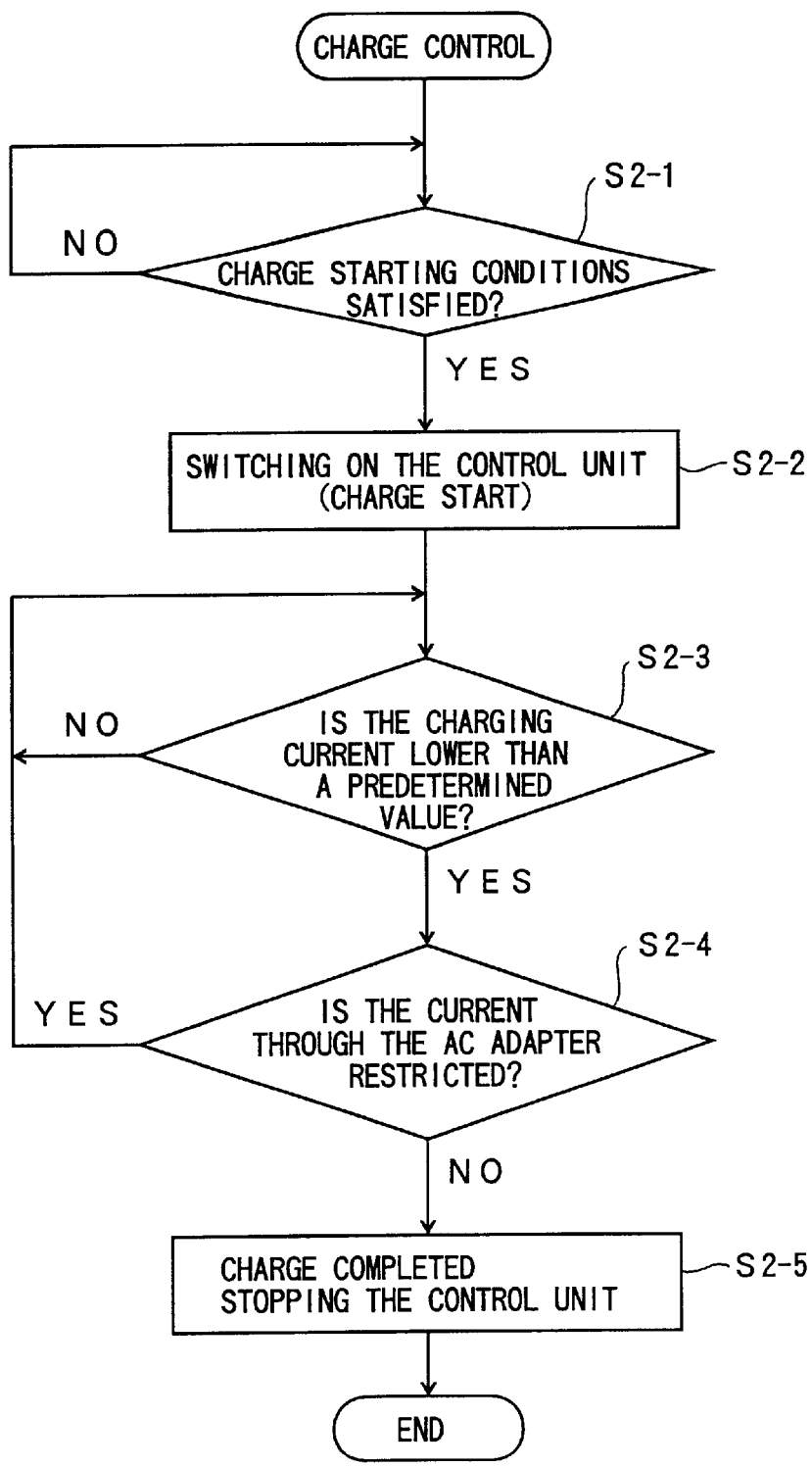
FIG. 8 is a flowchart of an operation of a microcomputer of the first embodiment of the present invention.

FIG. 8 is a flowchart of the operation of the microcomputer of the first embodiment of the present invention.

Figure 4:
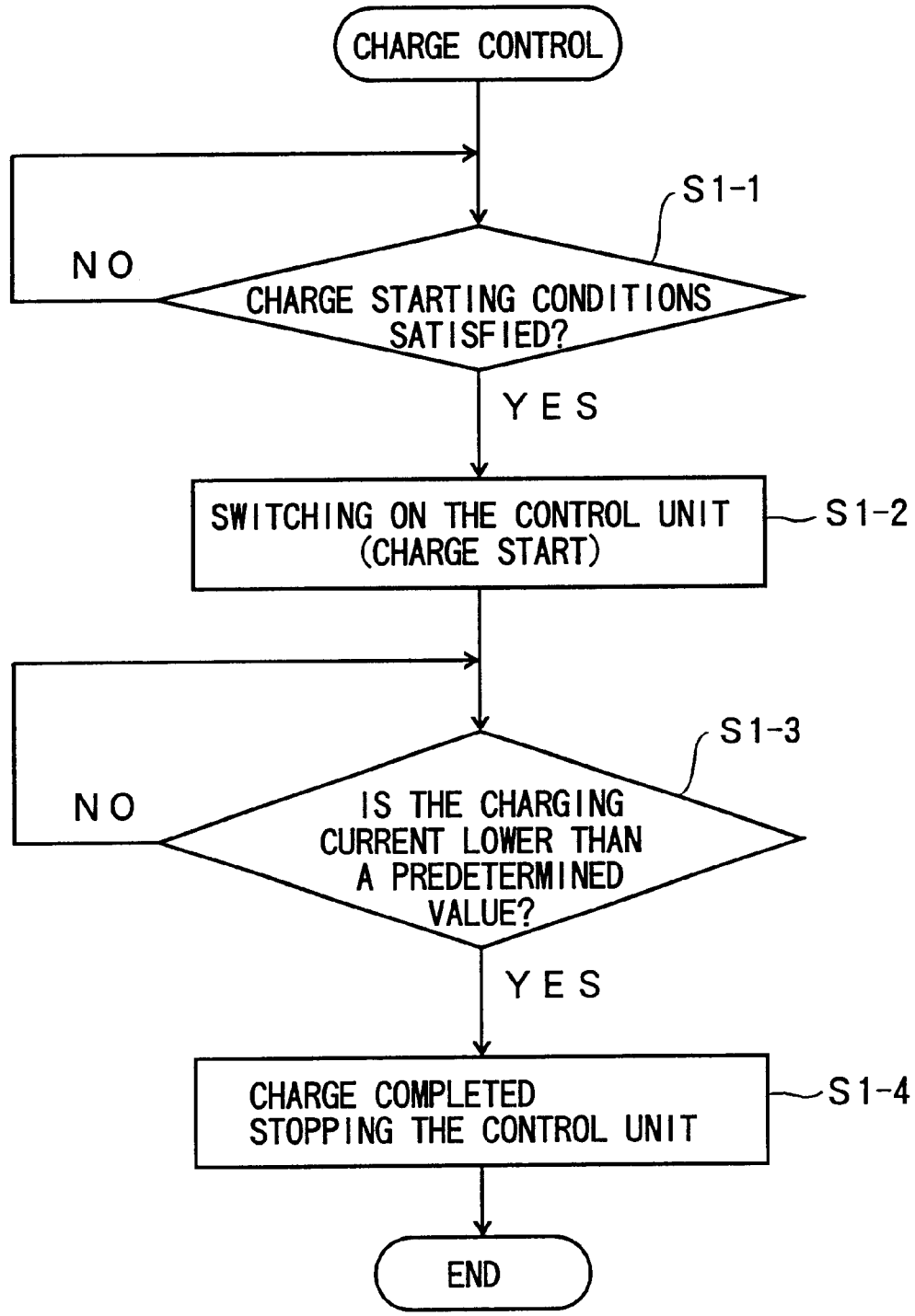
FIG. 4 is a flowchart of an operation of a microcomputer of the example structure of the prior art.
Figure 5A:
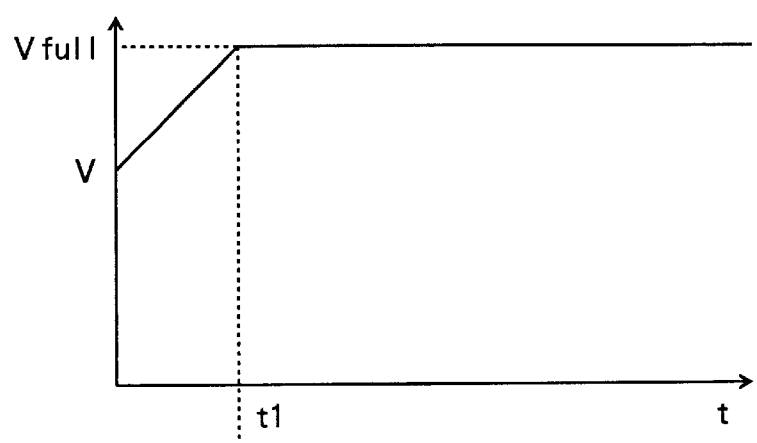
FIGS. 5A and 5B shows charging characteristics of a battery of the prior art.
Figure 5B:
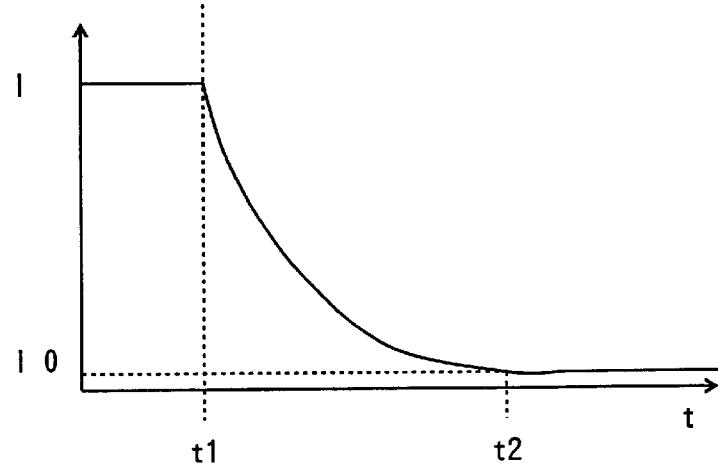

First in step S2-1, the microcomputer 32 determines whether all the charge starting conditions are satisfied, as in the step S1-1 in FIG. 4.

If all the charge starting conditions are satisfied, the microcomputer 32 switches on the control unit 31 in step S2-2. The control unit 31 then performs PWM control on the current to be supplied to the battery 5 in accordance with the voltages at both ends of the resistor R1 and the charging current detecting resistor R0.

In step S2-3, the microcomputer 32 determines whether the charging current becomes lower than a predetermined value during the charging. The determination is made from the output signal from the differential amplifier 9. When the charging current becomes lower than the predetermined value, the voltages at both ends of the charging current detecting resistor R0 also decrease, and the output of the differential amplifier 9 becomes smaller. Accordingly, whether the charging current becomes lower than the predetermined value can be determined from the output of the differential amplifier 9.

If the charging current is determined not to be lower than the predetermined value in the step S2-3, the charging is continued. If the charging current is determined to be lower than the predetermined value in the step S2-3, the microcomputer 32 determines whether the AC adapter 1 restricts the current to be supplied to the battery 5 in step S2-4. This determination is made from a signal outputted from the output terminal T8. If the output of the voltage comparator 33 is high, the microcomputer 32 determines that the AC adapter 1 restricts the current to be supplied to the battery 5.

If the AC adapter 1 restricts the current to be supplied to the battery 5, i.e., if the output signal of the output terminal T8 is high, the microcomputer 32 returns to the step S2-3 to continue the operation of the control unit 31.

If the AC adapter 1 does not restrict the current to be supplied to the battery 5, i.e., if the output signal from the output terminal T8 is low, the microcomputer 32 determines that the battery 5 has been fully charged, and stops the operation of the control unit 31, thereby ending the charging of the battery 5.

As described so far, even if the AC adapter 1 restricts the current to be supplied to the battery 5 because of an increase in current consumption in the load 6, the microcomputer 32 determines, from a decrease in charging current and a decrease in charging voltage for the battery 5, that the battery 5 is not full, and does not stop the operation of the control unit 31. By doing so, the battery 5 can be recharged when the current consumption by the load 6 decreases. Thus, the battery 5 can be fully charged.

In this embodiment, a restriction on the current in the AC adapter is detected by the voltage comparator 33 comparing the outputs of the error amplifiers 17 to 19. However, it is also possible to detect the current restriction by comparing the outputs of the error amplifiers 18 and 19 with a predetermined reference voltage.

Figure 9:
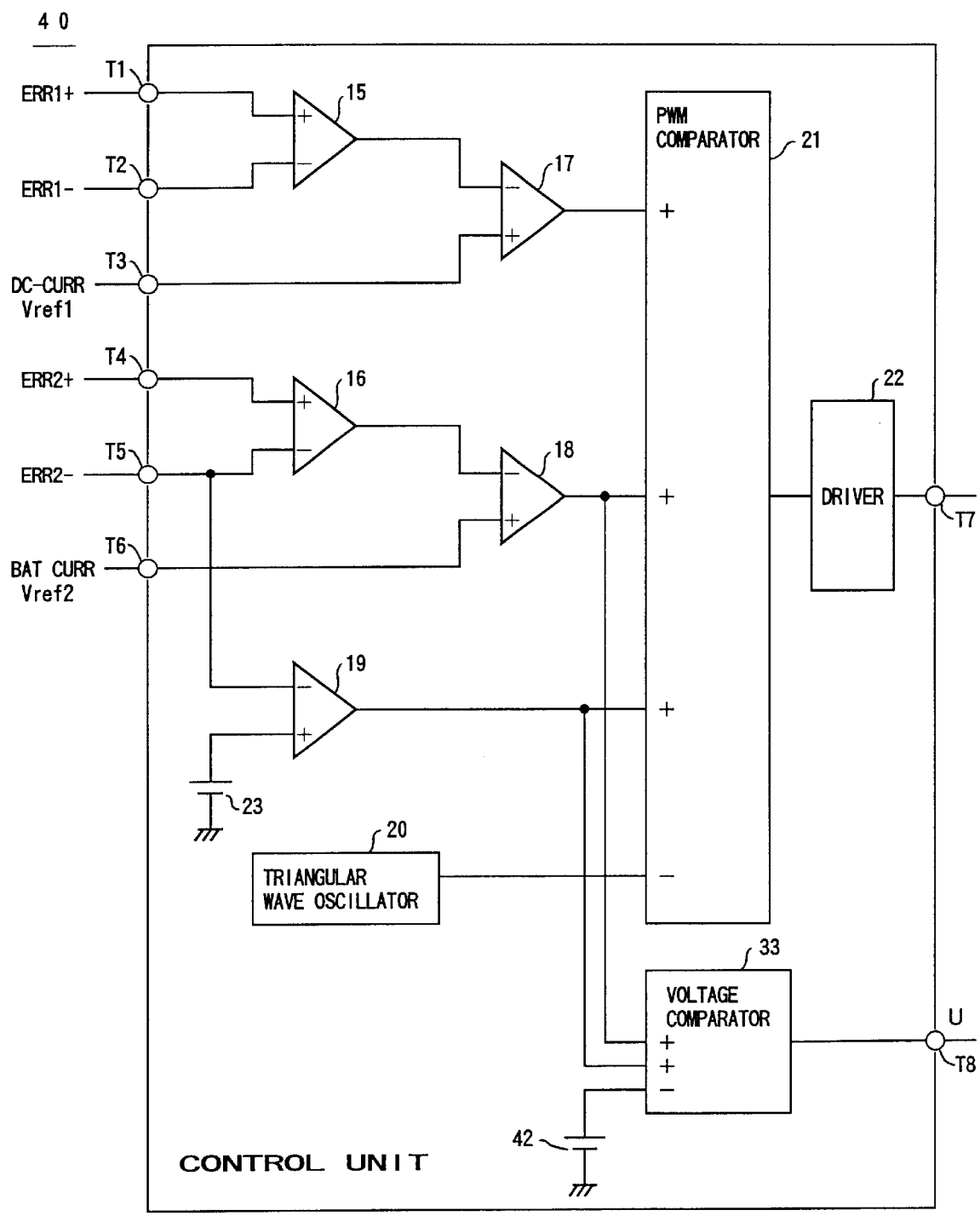
FIG. 9 is a block diagram of a first modification of the control unit of the first embodiment of the present invention.

FIG. 9 is a block diagram of a first modification of the control unit of the first embodiment of the present invention. In this figure, the same components as in FIG. 7 are denoted by the same reference numerals.

A modified control unit 40 supplies the outputs of the error amplifiers 18 and 19 to the two non-inverting input terminals of the voltage comparator 33, and supplies a reference voltage Vref4 from a reference voltage supply 42 to the inverting input terminal of the voltage comparator 33.

The voltage comparator 33 compares the outputs of the error amplifiers 18 and 19 with the reference voltage Vref4 generated from the reference voltage supply 42. The voltage comparator 33 outputs an output signal through the output terminal T8. When the outputs of the error amplifiers 18 and 19 are lower than the reference voltage Vref4 generated from the reference voltage supply 42, the output signal from the voltage comparator 33 is low. When the outputs of the error amplifiers 18 and 19 are higher than the reference voltage Vref4 generated from the reference voltage supply 42, the output signal from the voltage comparator 33 is high.

The reference voltage Vref4 generated from the reference voltage supply 42 is set larger than the maximum value of the saw-tooth wave generated by the triangular wave oscillator 2, so that the outputs of the error amplifier 18 and 19 beyond the control range can be detected.

When the power supply capacity of the AC adapter 1 is limited, the current to be supplied to the battery 5 is smaller than the current supplied from the battery 5. In such a situation, the outputs of the error amplifiers 18 and 19 exceed the control range. Therefore, the reference voltage Vref4 is set larger than the saw-tooth wave generated from the triangular wave oscillator 20, so that the restriction on the power supply capacity of the AC adapter 1 can be detected when the outputs of the error amplifiers 18 and 19 become higher than the reference voltage Vref4.

In this modification, the restriction on the current in the AC adapter 1 is detected by comparing the outputs of the error amplifiers 18 and 19, i.e., errors in charging current and charging voltage, with the reference voltage Vref4. However, it is also possible to detect the restriction on the current in the AC adapter 1 from the output current of the AC adapter 1.

Figure 10:
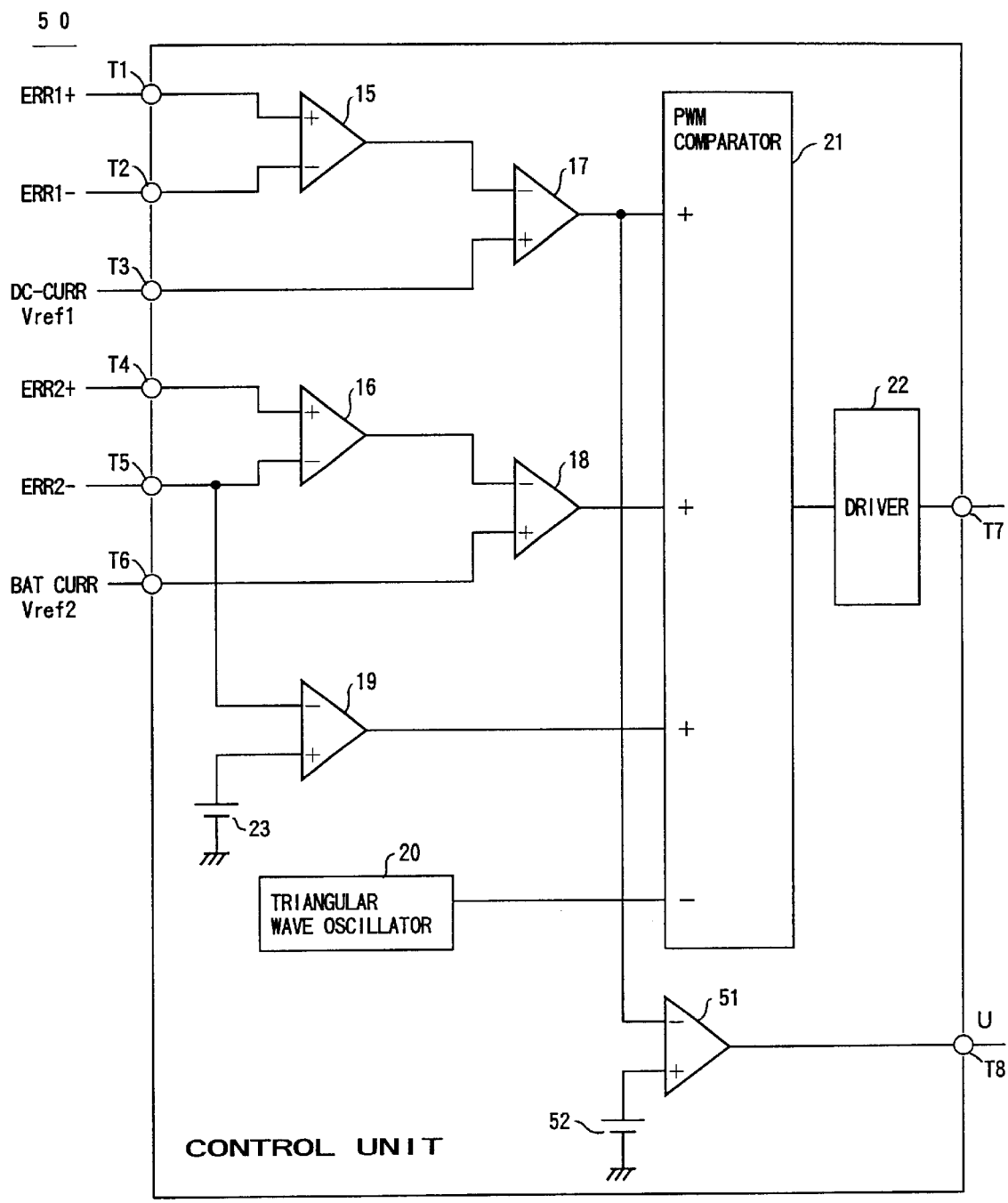
FIG. 10 is a block diagram of a second modification of the control unit of the first embodiment of the present invention.

FIG. 10 is a block diagram of a second modification of the control unit of the first embodiment of the present invention. In this figure, the same components as in FIG. 7 are denoted by the same reference numerals.

A modified control unit 50 has a two-input voltage comparator 51 and a reference voltage supply 52 in place of the three-input voltage comparator 33 and the reference voltage supply 42. The output of the error amplifier 17 is supplied to the inverting input terminal of the two-input voltage comparator 51, while a reference voltage Vref5 generated from the reference voltage supply 52 is supplied to the non-inverting input terminal of the two-input voltage comparator 51.

The two-input voltage comparator 51 compares the output of the error amplifier 17 with the reference voltage Vref5. The two-input voltage comparator 51 outputs a signal which is low when the output of the error amplifier 17 is higher than the reference voltage Vref5 and is high when the output of the error amplifier 17 is lower than the reference voltage Vref5.

As the output current of the AC adapter 1 increases and approaches the power supply capacity, the output of the error amplifier 17 decreases. As the output of the error amplifier 17 becomes lower than the reference voltage Vref5, the output signal from the voltage comparator 51 becomes high. Thus, the restriction on the output current of the AC adapter 1 can be detected.

In the first embodiment, the current of the AC adapter 1 is detected from the voltages at both ends of the resistor R1, so that the control 59 unit 31, 40, or 50 can be controlled. However, it is also possible to control the control unit with the voltage of the AC adapter 1.

Figure 11:
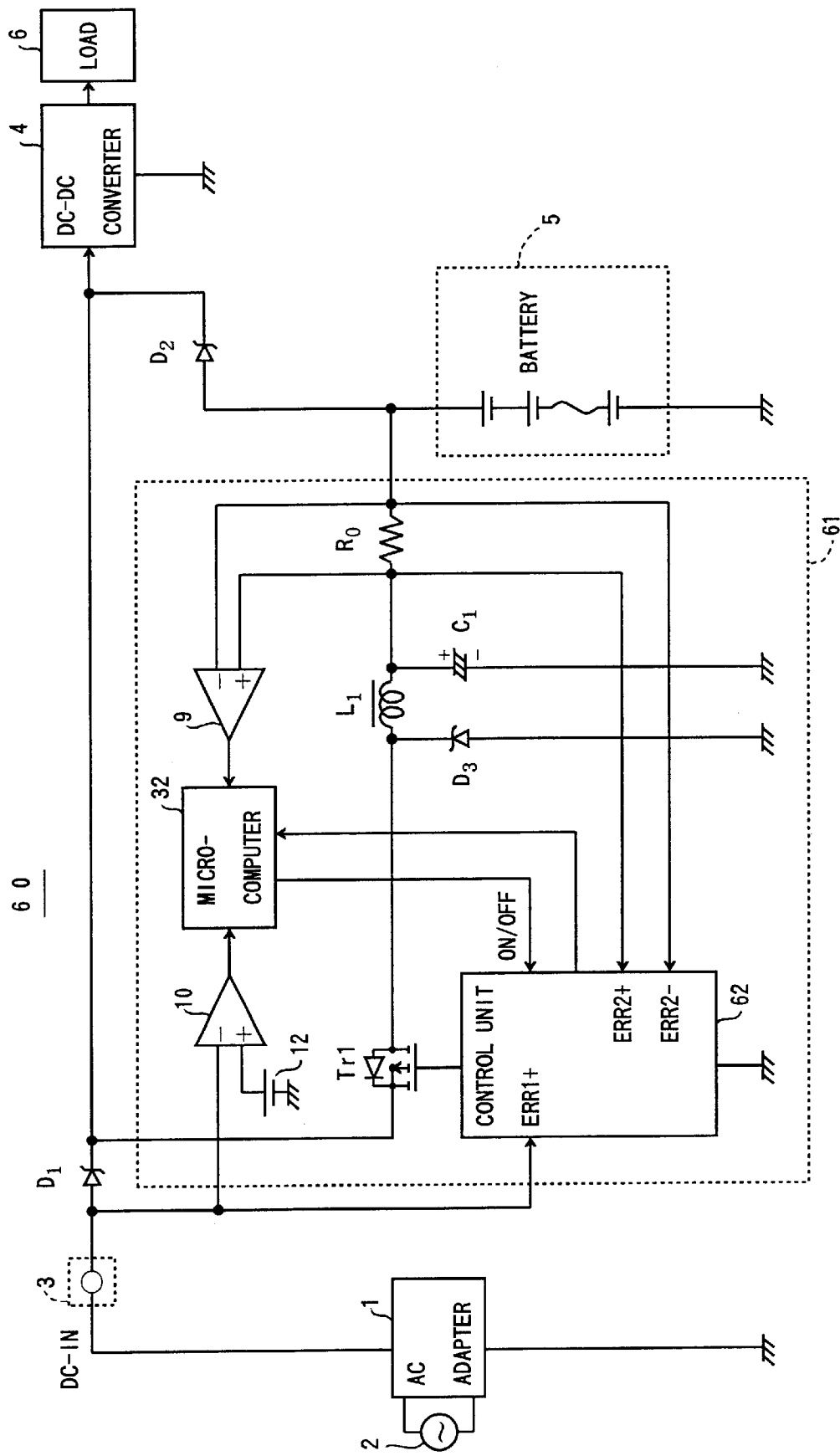
FIG. 11 is a block diagram of a second embodiment of the power supply unit of the present invention.

FIG. 11 is a block diagram of a second embodiment of the present invention. In this figure, the same components as in FIG. 6 are denoted by the same reference numerals.

A power supply unit 60 of this embodiment does not have the resistor R1 for detecting the output current of the AC adapter 1, and a charger circuit 61 has a different structure from the charger circuit 30 of the first embodiment. The output current of the adapter 1 is supplied to the DC/DC converter 4 via the diode D1.

The charger circuit 61 of this embodiment has a control unit 62 which has a different structure from the control unit 31 of the first embodiment. The control unit 62 of this embodiment detects the output voltage of the AC adapter 1 and the charging current and the charging voltage for the battery to control the switching transistor Tr1.

Figure 12:
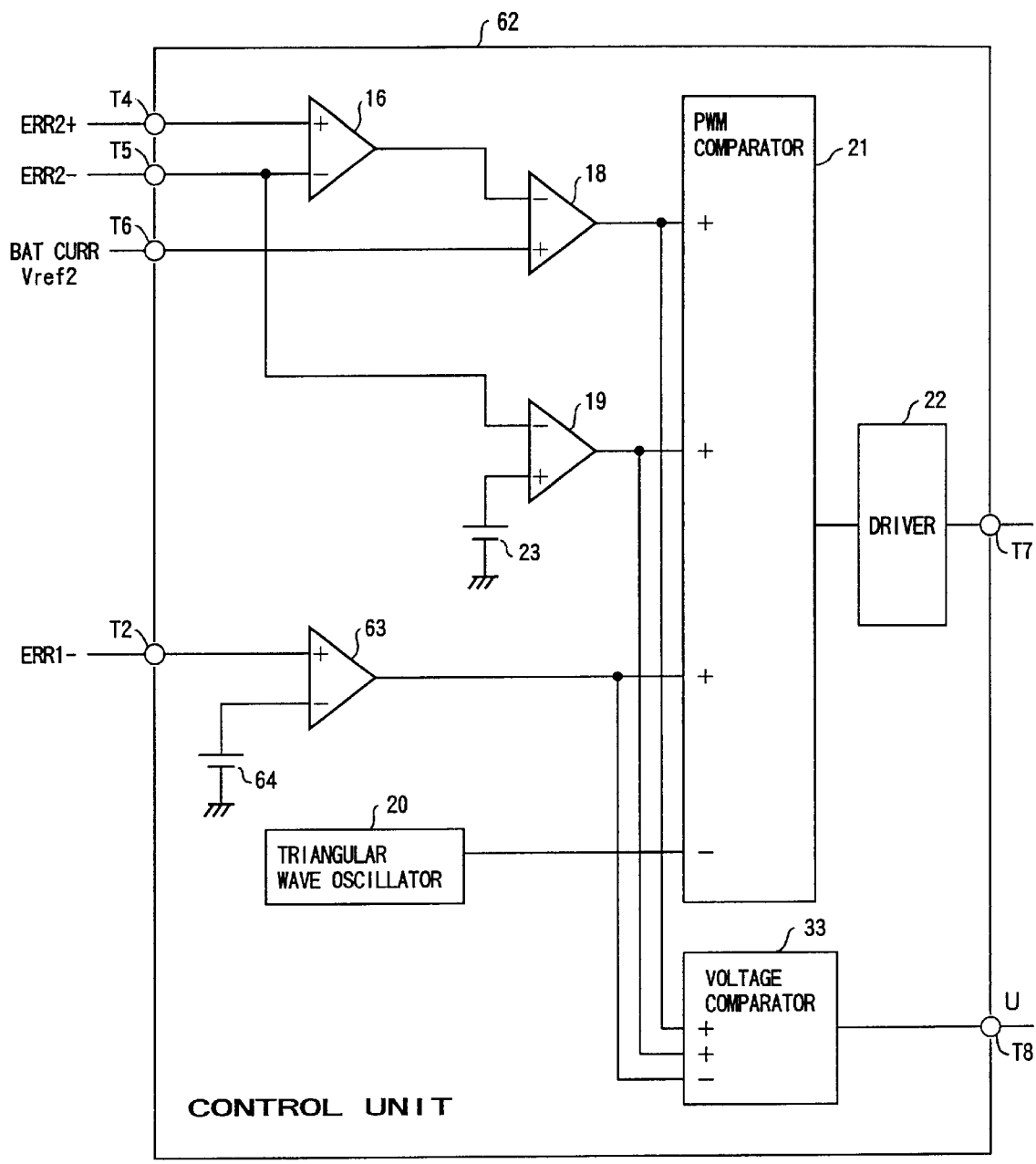
FIG. 12 is a block diagram of a control unit of the second embodiment of the present invention.

FIG. 12 is a block diagram of the control unit of the second embodiment of the present invention. In this figure, the same components as in FIG. 7 are denoted by the same reference numerals.

The control unit 62 of this embodiment comprises the differential amplifier 16, the error amplifiers 18 and 19, an error amplifier 63, the triangular wave oscillator 20, the PWM comparator 21, the driver 22, the reference voltage supply 23, and a reference voltage supply 64.

The output voltage of the AC adapter 1 is applied to the input terminal T2. The input terminal T2 is connected to the non-inverting input terminal of the error amplifier 63. The inverting input terminal of the error amplifier 63 is connected to the reference voltage supply 64.

The error amplifier 63 outputs a differential signal of the output voltage of the adapter 1 and a reference voltage Vref6 generated from the reference voltage supply 64. The output of the error amplifier 63 is supplied to the inverting input terminal of the three-input voltage comparator 33. The outputs of the error amplifiers 18 and 19 are supplied to the non-inverting input terminals of the voltage comparator 33. The three-input voltage comparator 33 compares the outputs of the error amplifiers 18 and 19 with the output of the error amplifier 63.

The voltage comparator 33 outputs a signal which is low when the outputs of the error amplifiers 18 and 19 are both smaller than the output of the error amplifier 63, and which is high when either of the outputs of the error amplifiers 18 and 19 is larger than the output of the error amplifier 63.

When the outputs of the error amplifiers 18 and 19 are both smaller than the output of the error amplifier 63, it is determined that a normal operation is being carried out. When either of the outputs of the error amplifiers 18 and 19 is larger than the output of the error amplifier 63, it is determined that the output current of the adapter 1 is restricted.

The output of the voltage comparator 33 is supplied to the microcomputer 32, which then carries out the operation shown in FIG. 8. Thus, the control unit 62 is not stopped due to the restriction on the current of the AC adapter 1.

In this embodiment, the voltage comparator 33 compares the outputs of the error amplifiers 18 and 19 with the output of the error amplifier 63. However, it is also possible to compare the outputs of the error amplifiers 18 and 19 with a predetermined reference voltage.

Figure 13:
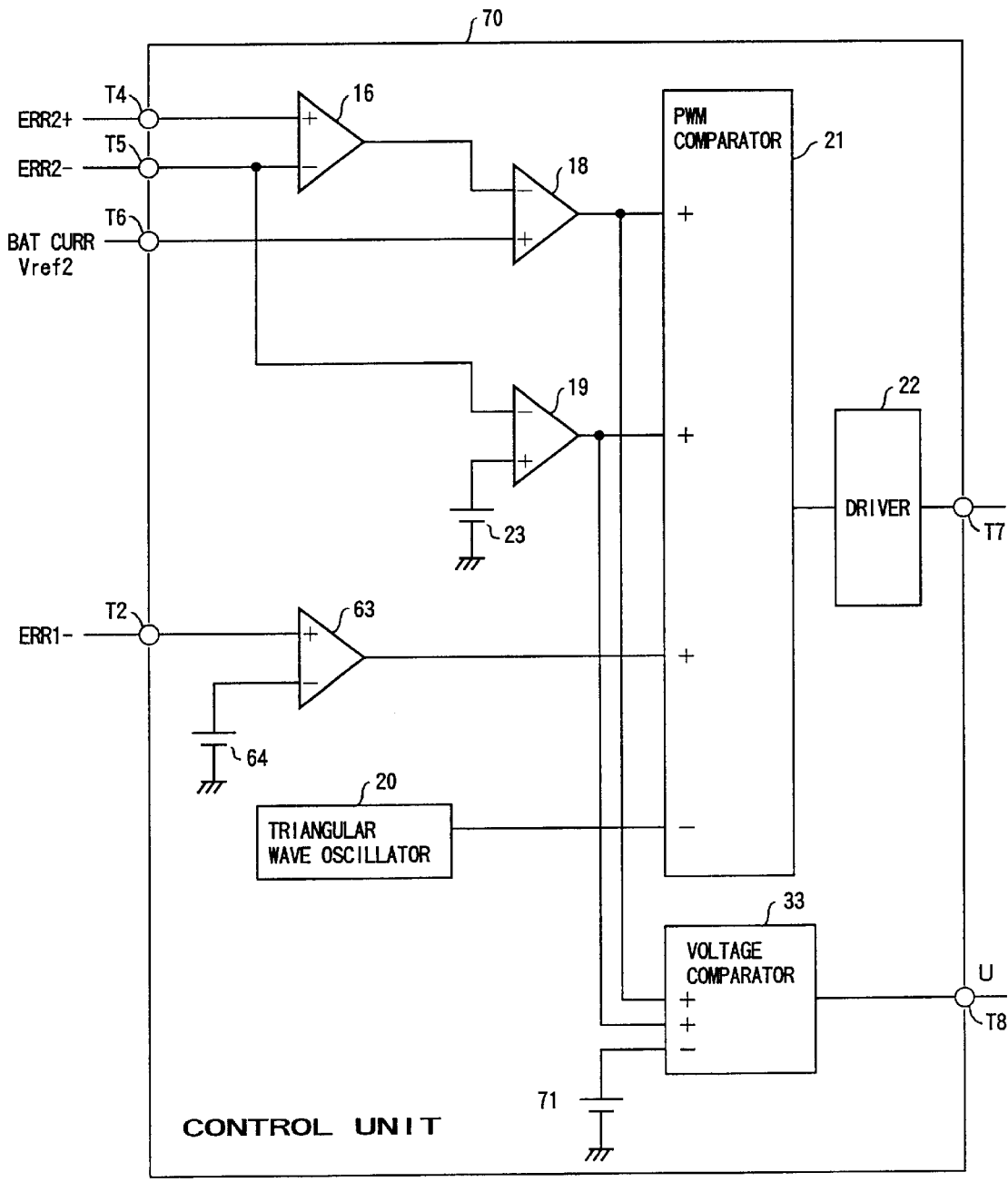
FIG. 13 is a block diagram of a first modification of the control unit of the second embodiment of the present invention.

FIG. 13 is a block diagram of a first modification of the control unit of the second embodiment of the present invention. In this figure, the same components as in FIG. 12 are denoted by the same reference numerals.

A modified control unit 70 has a reference voltage supply 71 connected to the inverting input terminal of the voltage comparator 33. The voltage comparator 33 outputs a signal which is low when the outputs of the error amplifiers 18 and 19 are both lower than a reference voltage Vref7 generated from the reference voltage supply 71, and which is high when either of the outputs of the error amplifiers 18 and 19 is higher than the reference voltage Vref7 generated from the reference voltage supply 71.

When the outputs of the error amplifiers 18 and 19 are both lower than the reference voltage Vref7 generated from the reference voltage supply 71, it is determined that a normal operation is being carried out. When either of the outputs of the error amplifiers 18 and 19 is higher than the reference voltage Vref7 generated from the reference voltage supply 71, it is determined that the output current of the adapter 1 is restricted.

The output of the voltage comparator 33 is supplied to the microcomputer 32, which in turn performs the operation shown in FIG. 8. Thus, the operation of the control unit 70 is not stopped due to the restriction on the current in the AC adapter 1.

In this modification, the voltage comparator 33 compares the outputs of the error amplifiers 18 and 19 with the reference voltage Vref7 generated from the reference voltage supply 71. However, it is also possible to compare the output of the error amplifier 63 with a predetermined reference voltage.

Figure 14:
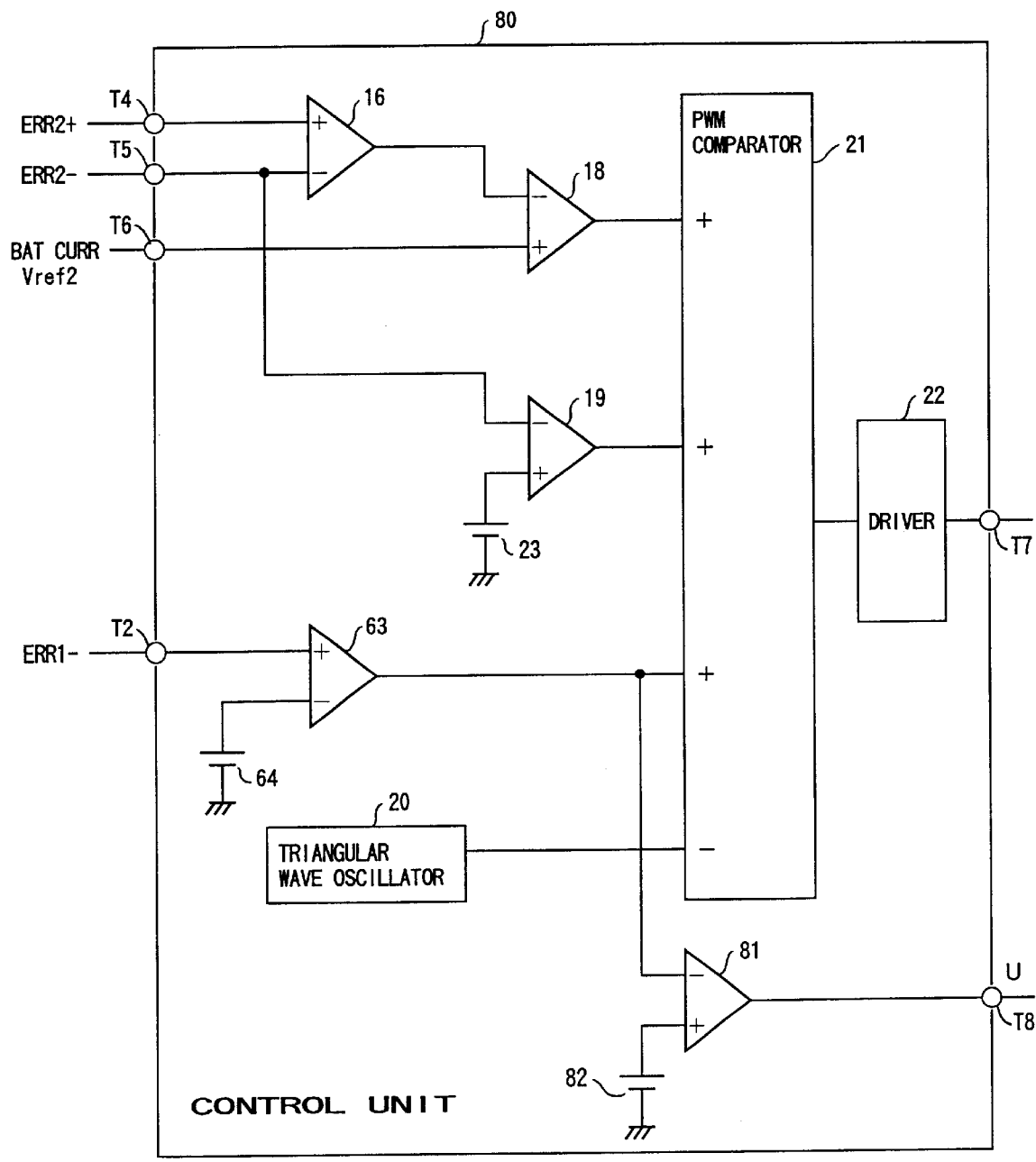
FIG. 14 is a block diagram of a second modification of the control unit of the second embodiment of the present invention.

FIG. 14 is a block diagram of a second modification of the control unit of the second embodiment of the present invention. In this figure, the same components as in FIG. 13 are denoted by the same reference numerals.

A modified control unit 80 has a two-input voltage comparator 81 in place of the three-input voltage comparator 33. The output of the error amplifier 63 is supplied to the inverting input terminal of the voltage comparator 81, while a reference voltage supply 82 is connected to the non-inverting input terminal of the voltage comparator 81.

The voltage comparator 81 outputs a signal which is low when the output of the error amplifier 63 is lower than a reference voltage Vref8 generated from the reference voltage supply 82, and which is high when the output of the error amplifier 63 is higher than the reference voltage Vref8 generated from the reference voltage supply 82.

When the output of the error amplifier 63 is lower than the reference voltage Vref8 generated from the reference voltage supply 81, i.e., when the error is small, it is determined that a normal operation is being carried out. When the output of the error amplifier 63 is higher than the reference voltage Vref8 generated from the reference voltage supply 81, i.e., when the error is large, it is determined that the output current of the adapter 1 is restricted.

The output of the voltage comparator 81 is supplied to the microcomputer 32, which in turn performs the operation shown in FIG. 8. Thus, the operation of the control unit 80 is not stopped due to the restriction on the power supply capacity of the AC adapter 1.

It should be noted that, in the first and second embodiments, the charging of the battery 5 is controlled. However, the battery charge control methods can be applied to a plurality of batteries aligned in parallel.

Figure 15:
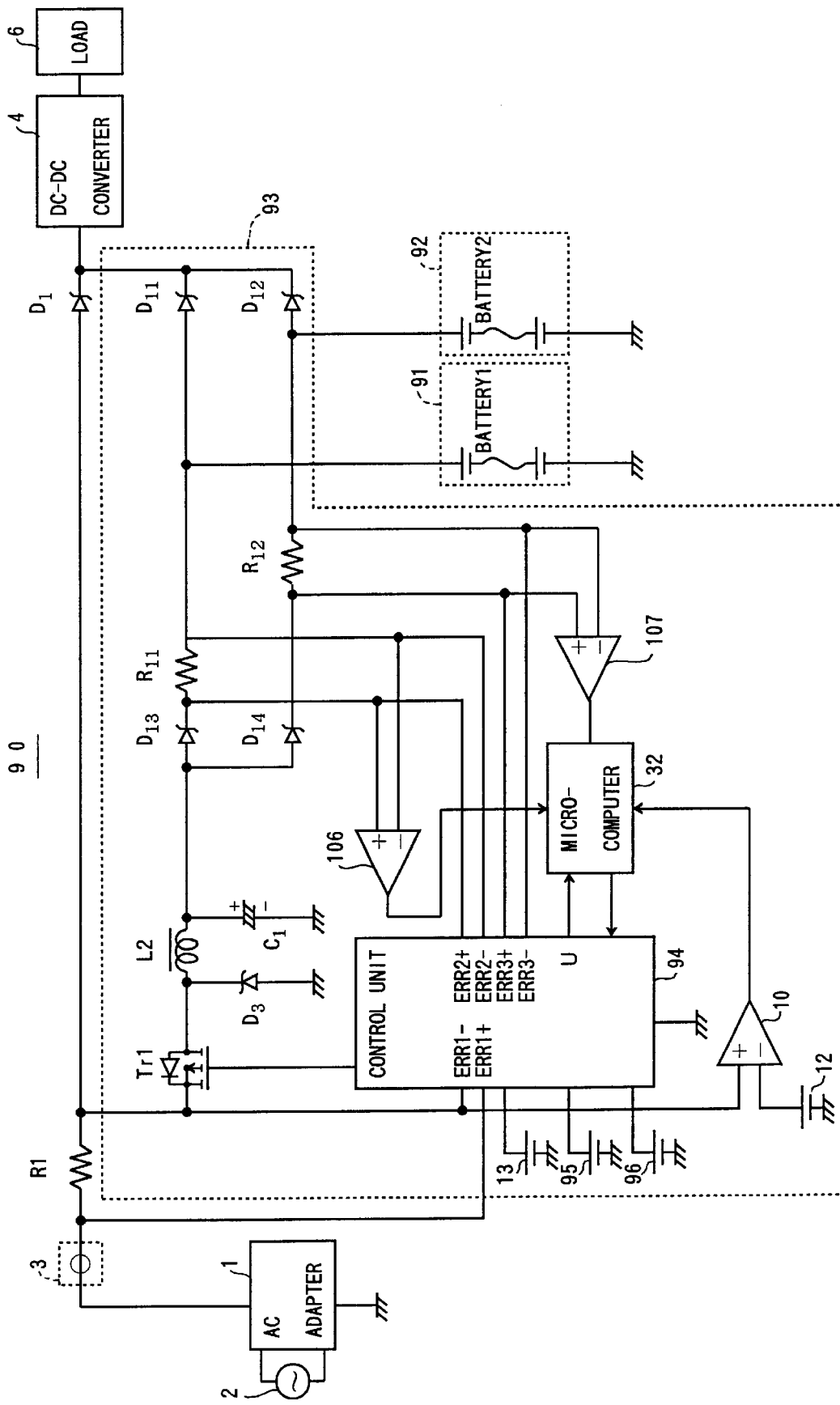
FIG. 15 is a block diagram of a third embodiment of the power supply unit of the present invention.

FIG. 15 is a block diagram of a third embodiment of the present invention. In this figure, the same components as in FIG. 6 are denoted by the same reference numerals.

A power supply unit 90 of this embodiment has batteries 91 and 92 connected in parallel, and a charger circuit 93 which charges the batteries 91 and 92 in parallel.

The charger circuit 93 comprises the switching transistor Tr1, a control unit 94, a choke coil L2, the flywheel diode D3, the smoothing capacitor C1, charging current detecting resistors R11 and R12, differential amplifiers 106 and 107, the voltage comparator 10, the microcomputer 32, the reference voltage supplies 12 and 13, reference voltage supplies 95 and 96, and diodes D11 to D44.

The charging current detecting resistor R11 detects a charging current for the battery 91. The charging current detecting resistor R12 detects a charging current for the battery 92. The diodes D11 to D14 protect the batteries 91 and 92.

The charging current detecting resistor R11 is connected to the control unit 94 and the differential amplifier 106. The differential amplifier 106 supplies the microcomputer 32 with an output corresponding to the potential difference between both ends of the charging current detecting resistor R11.

The charging current detecting resistor R12 is connected to the control unit 94 and the differential amplifier 107. The differential amplifier 107 supplies the microcomputer 32 with an output corresponding to the potential difference between both ends of the charging current detecting resistor R12.

The control unit 94 controls the switching transistor Tr1 with the output current of the AC adapter 1 and the charging currents for the batteries 91 and 92 detected by the charging current detecting resistors R11 and R12.

Figure 16:
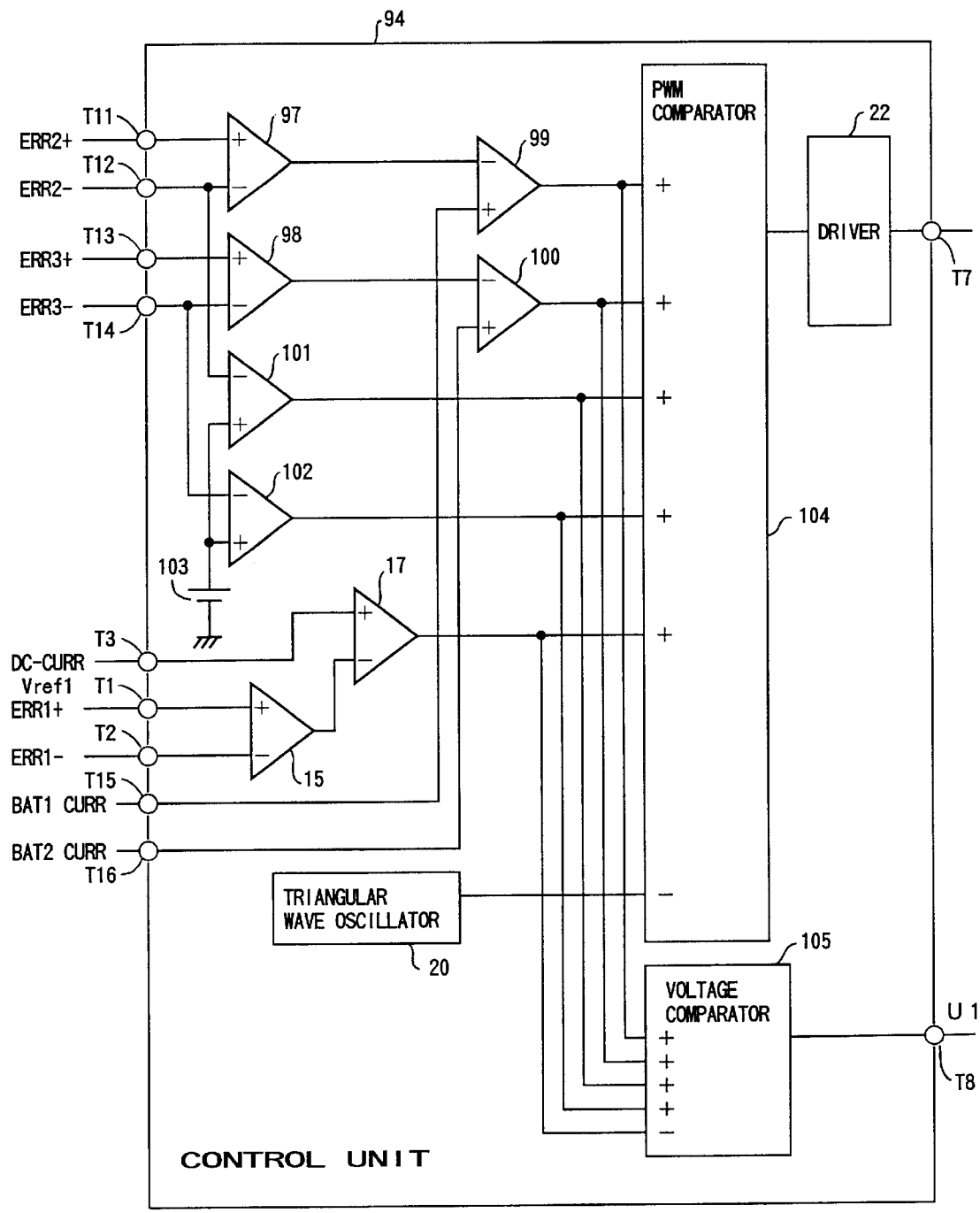
FIG. 16 is a block diagram of a control unit of the third embodiment of the present invention.

FIG. 16 is a block diagram of the control unit of the third embodiment of the present invention. In this figure, the same components as in FIG. 7 are denoted by the same reference numerals.

The control unit 94 of this embodiment comprises the differential amplifier 15, differential amplifiers 97 and 98, the error amplifier 17, error amplifiers 99 to 102, the triangular wave oscillator 20, the driver 22, a reference voltage supply 103, a PWM comparator 104, and a voltage comparator 105.

The control unit 94 has the input terminals T1 to T3, input terminals T11 to T16, and the output terminals T7 and T8. Both ends of the resistor R1 are connected to the input terminals T1 and T2, and the reference voltage supply 13 is connected to the input terminal T3. Both ends of the resistor R11 are connected to the input terminals T11 and T12, while both ends of the resistor R12 are connected to the input terminals T13 and T14. The reference voltage supply 95 is connected to the input terminal T15, while the reference voltage supply 96 is connected to the input terminal T16. The output terminals T7 and T8 are connected to the microcomputer 32.

The input terminal T11 is connected to the non-inverting input terminal of the differential amplifier 97, while the input terminal T12 is connected to the inverting input terminals of the differential amplifier 97 and the error amplifier 101. The differential amplifier 97 outputs a signal corresponding to the voltages at both ends of the resistor R11, i.e., a signal corresponding to the charging current for the battery 91.

The input terminal T13 is connected to the non-inverting input terminal of the differential amplifier 98, while the input terminal T14 is connected to the inverting input terminals of the differential amplifier 98 and the error amplifier 102. The differential amplifier 98 outputs a signal corresponding to the voltages at both ends of the resistor R12, i.e., a signal corresponding to the charging current for the battery 92.

The reference voltage supply 103 is connected to the non-inverting input terminals of the error amplifiers 101 and 102. The error amplifier 101 outputs a differential signal of the charging voltage for the battery 91 and a reference voltage generated Vref10 from the reference voltage supply 103. The error amplifier 102 outputs a differential signal of the charging voltage for the battery 92 and the reference voltage generated from the reference voltage supply 103.

The output of the differential amplifier 97 is supplied to the inverting input terminal of the error amplifier 99. The input terminal T15 is connected to the non-inverting input terminal of the error amplifier 99. The error amplifier 99 outputs a differential signal of the output of the differential amplifier 97 and a reference voltage Vref9a generated from the reference voltage supply 95.

The output of the differential amplifier 98 is supplied to the inverting input terminal of the error amplifier 100. The input terminal T16 is connected to the non-inverting input terminal of the error amplifier 100. The error amplifier 100 outputs a differential signal of the output of the differential amplifier 98 and a reference voltage Vref9b generated from the reference voltage supply 96.

The outputs of the error amplifiers 17, 99, 100, 101, and 102 are supplied to the non-inverting input terminals of the PWM comparator 104. The output of the triangular wave oscillator 20 is supplied to the inverting input terminal of the PWM comparator 104.

The PWM comparator 104 compares each of the outputs of the error amplifiers 17, 99, 100, 101, and 102 with the output of the triangular wave oscillator 20. The PWM comparator 104 then outputs the AND logic of the comparison result. The output signal of the PWM comparator 104 is high when any of the outputs of the error amplifiers 17, 99, 100, 101, and 102 is larger than the output of the triangular wave oscillator 20. The output signal is low when the outputs of the error amplifiers 17, 99, 100, 101, and 102 are all smaller than the output of the triangular wave oscillator 20.

The outputs of the error amplifiers 99, 100, 101, and 102 are also supplied to the non-inverting input terminals of the voltage comparator 105. Only the output of the error amplifier 17 is supplied to the inverting input terminal of the voltage comparator 105.

The voltage comparator 105 compares the outputs of the error amplifiers 99 to 102 supplied through the non-inverting input terminals with the output of the error amplifier 17 supplied through the inverting input terminal. The voltage comparator 105 outputs the comparison result. The output signal of the voltage comparator 105 is low when the outputs of the error amplifiers 99 to 102 are all smaller than the output of the error amplifier 17. The output signal is high when any of the outputs of the error amplifiers 99 to 102 is larger than the output of the error amplifier 17.

When the AC adapter 1 operates in a normal state, the difference between the output current and the limiting current of the AC adapter 1 is large, and the output of the error amplifier 17 is also large. Meanwhile, the difference between the current required for charging the batteries 91 and 92 with and the current to be actually supplied to the batteries 91 and 92 is small. Accordingly, the output of the voltage comparator 105 becomes low.

When the output current of the AC adapter 1 approaches its capacity, the difference between the output current and the limiting current of the adapter 1 becomes small, and the output of the error amplifier 17 becomes also small. While the current is supplied to the load 6, the current supply to the batteries 91 and 92 is stopped. Accordingly, the difference between the current required for charging the batteries 91 and 92 and the current to be actually supplied to the batteries 91 and 92 becomes large, and the output of the voltage comparator 105 becomes high.

In this manner, a restriction on the current in the AC adapter 1 can be detected. In accordance with the output of the voltage comparator 105, the microcomputer 32 carries out the procedures shown in FIG. 8 so as to prevent a wrong operation.

In this embodiment, the outputs of the error amplifiers 99 to 102 are compared with the output of the error amplifier 17, so that the restriction on the current of the AC adapter 1 can be detected. However, it is also possible to detect the restriction on the current in the AC adapter 1 by comparing the outputs of the error amplifiers 99 to 102 with a predetermined reference voltage. The point of this operation is to detect a situation in which the power supply capacity of the AC adapter 1 is limited.

Figure 17:
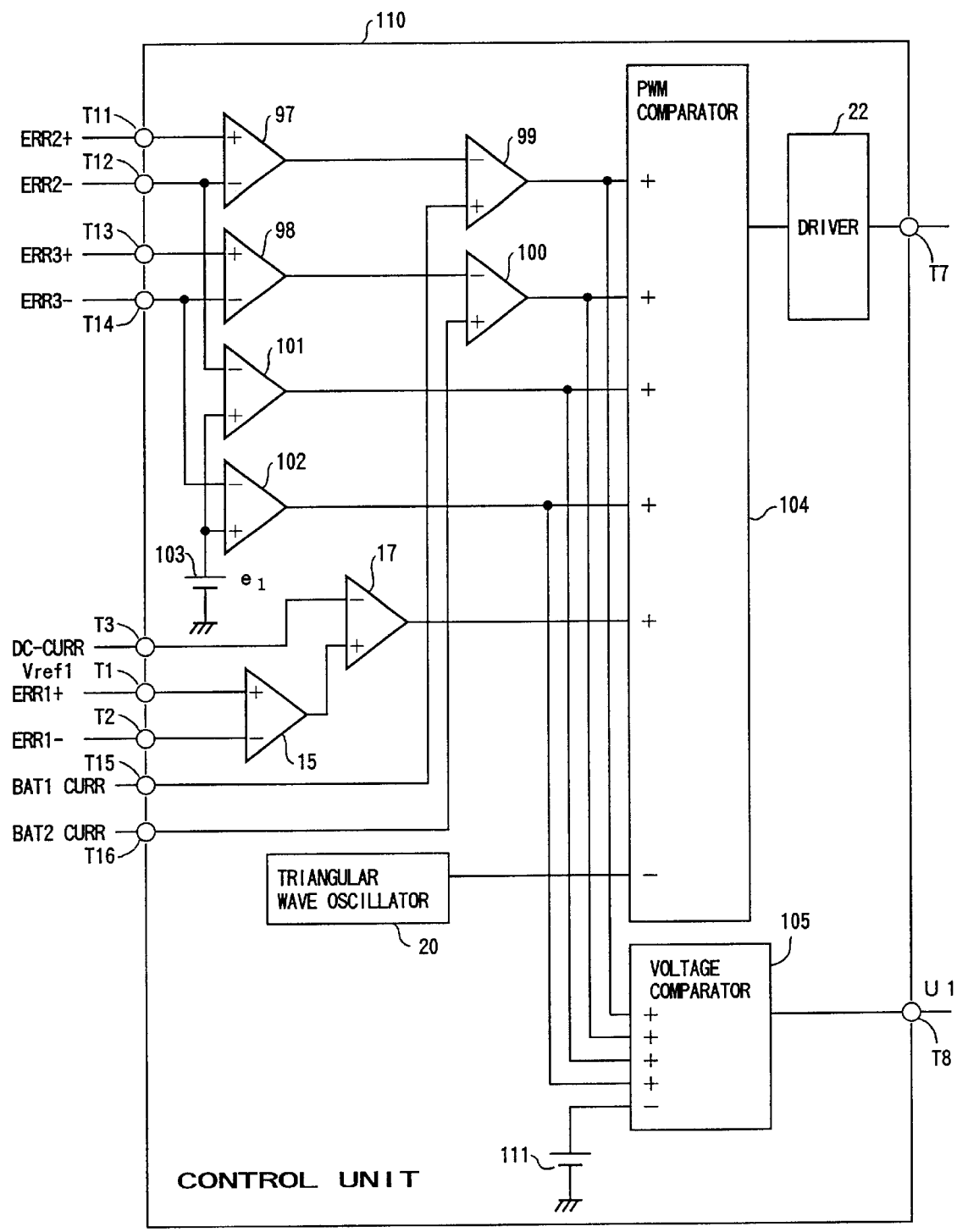
FIG. 17 is a block diagram of a first modification of the control unit of the third embodiment of the present invention.

FIG. 17 is a block diagram of a first modification of the control unit of the third embodiment of the present invention. In this figure, the same components as in FIG. 16 are denoted by the same reference numerals.

In a modified control unit 110, the outputs of the error amplifiers 99 to 102 are supplied to the four non-inverting input terminals of the voltage comparator 105, and a reference voltage Vref11 generated from a reference voltage supply 111 is supplied to the inverting input terminal of the voltage comparator 105.

The voltage comparator 105 then compares the outputs of the error amplifiers 99 to 102 with the reference voltage Vref11 generated from the reference voltage supply 111. The voltage comparator 105 outputs a signal through the output terminal T8. The output signal of the voltage comparator 105 is low when the outputs of the error amplifiers 99 to 102 are all lower than the reference voltage Vref11 generated from the reference voltage supply 111. The output signal of the voltage comparator 105 is high when any of the outputs of the error amplifiers 99 to 102 is higher than the reference voltage Vref11 generated from the reference voltage supply 111.

The reference voltage Vref11 generated from the reference voltage supply 11 is set higher than the maximum value of the saw-tooth wave generated from the triangular wave oscillator 20, so that the outputs of the error amplifier 99 to 102 outside the control range can be detected.

When the AC adapter is in the current restricted state, the current to be supplied to the batteries 91 and 92 is smaller than the current supplied from the batteries 91 and 92. As a result, the outputs of the error amplifiers 99 to 102 exceed the control range. Therefore, the reference voltage Vref11 is set higher than the saw-tooth wave generated from the triangular wave oscillator 20, so that the outputs of the error amplifiers 99 to 102 exceeding the reference voltage Vref11 can be detected. Thus, the current restricted state of the AC adapter 1 can be detected.

In this modification, the outputs of the error amplifiers 99 to 102 are compared with the reference voltage Vref11 to detect the current restricted state of the AC adapter 1. However, it is also possible to detect the power capacity restricted state of the AC adapter 1 from the output current of the AC adapter 1.

Figure 18:
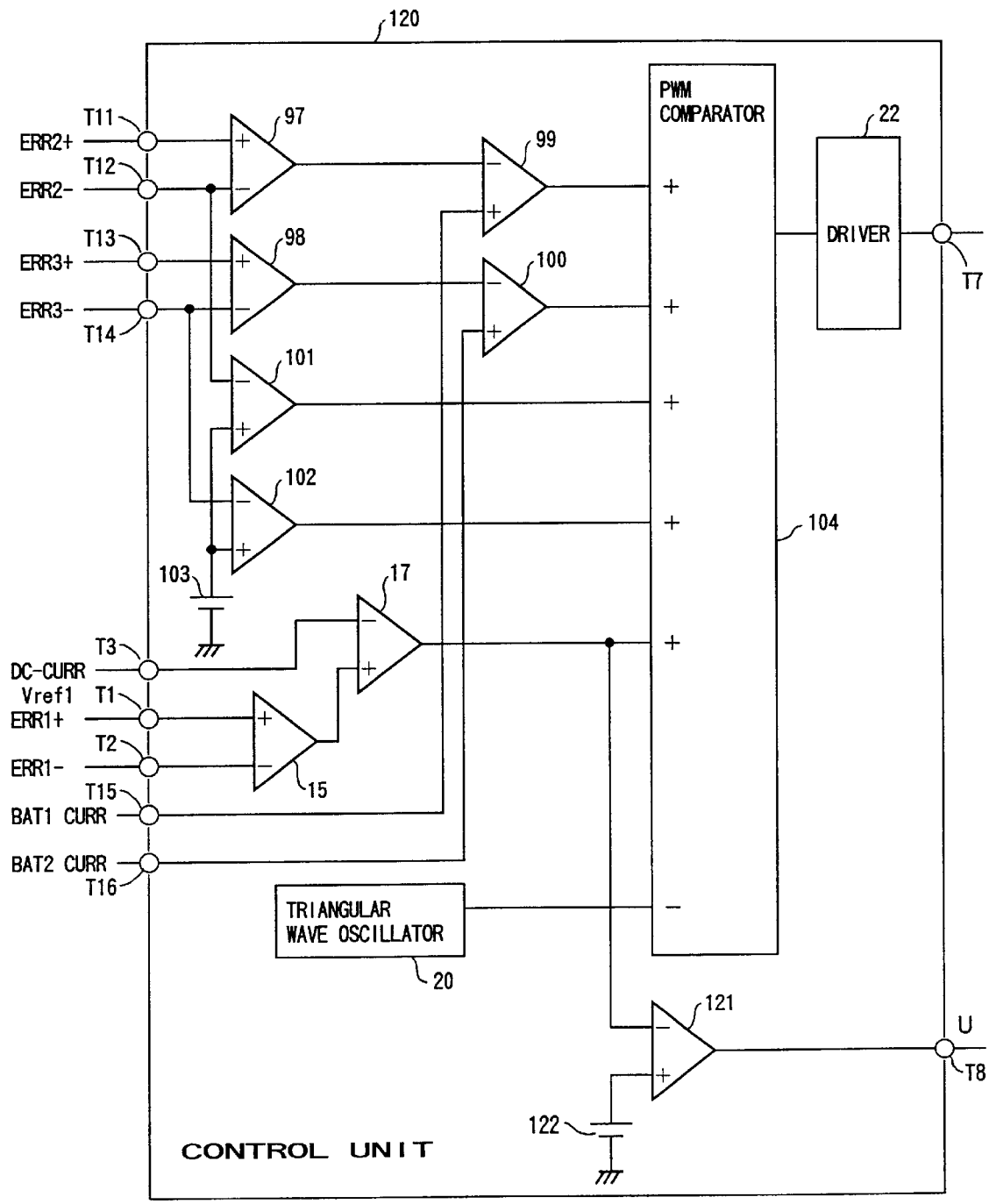
FIG. 18 is a block diagram of a second modification of the control unit of the third embodiment of the present invention.

FIG. 18 is a block diagram of a second modification of the control unit of the third embodiment of the present invention. In this figure, the same components as in FIG. 17 are denoted by the same reference numerals.

A modified control unit 120 has a two-input voltage comparator 121 and a reference voltage supply 122 in place of the five-input voltage comparator 105 and the reference voltage supply 111. The output of the error amplifier 17 is supplied to the inverting input terminal of the voltage comparator 121, while a reference voltage Vref12 generated from the reference voltage supply 122 is supplied to the non-inverting input terminal of the voltage comparator 121.

The voltage comparator 121 compares the output of the error amplifier 17 with the reference voltage Vref12. The voltage comparator 121 outputs a signal through the output terminal T8. The output signal of the voltage comparator 121 is low when the output of the error amplifier 17 is higher than the reference voltage Vref12. The output signal of the voltage comparator 121 is high when the output of the error amplifier 17 is lower than the reference voltage Vref12.

As the output current of the AC adapter 1 increases and approaches the limit, the output of the error amplifier 17 decreases. When the output of the error amplifier 17 becomes lower than the reference voltage Vref12, the output signal of the voltage comparator 121 becomes high. Thus, the restriction on the output current of the AC adapter 1 can be detected.

In the third embodiment, each of the control units 94, 110, and 120 is controlled with the voltages at both ends of the resistor R1. However, it is also possible to control the control unit with the charging current for the batteries 91 and 92.

Figure 19:
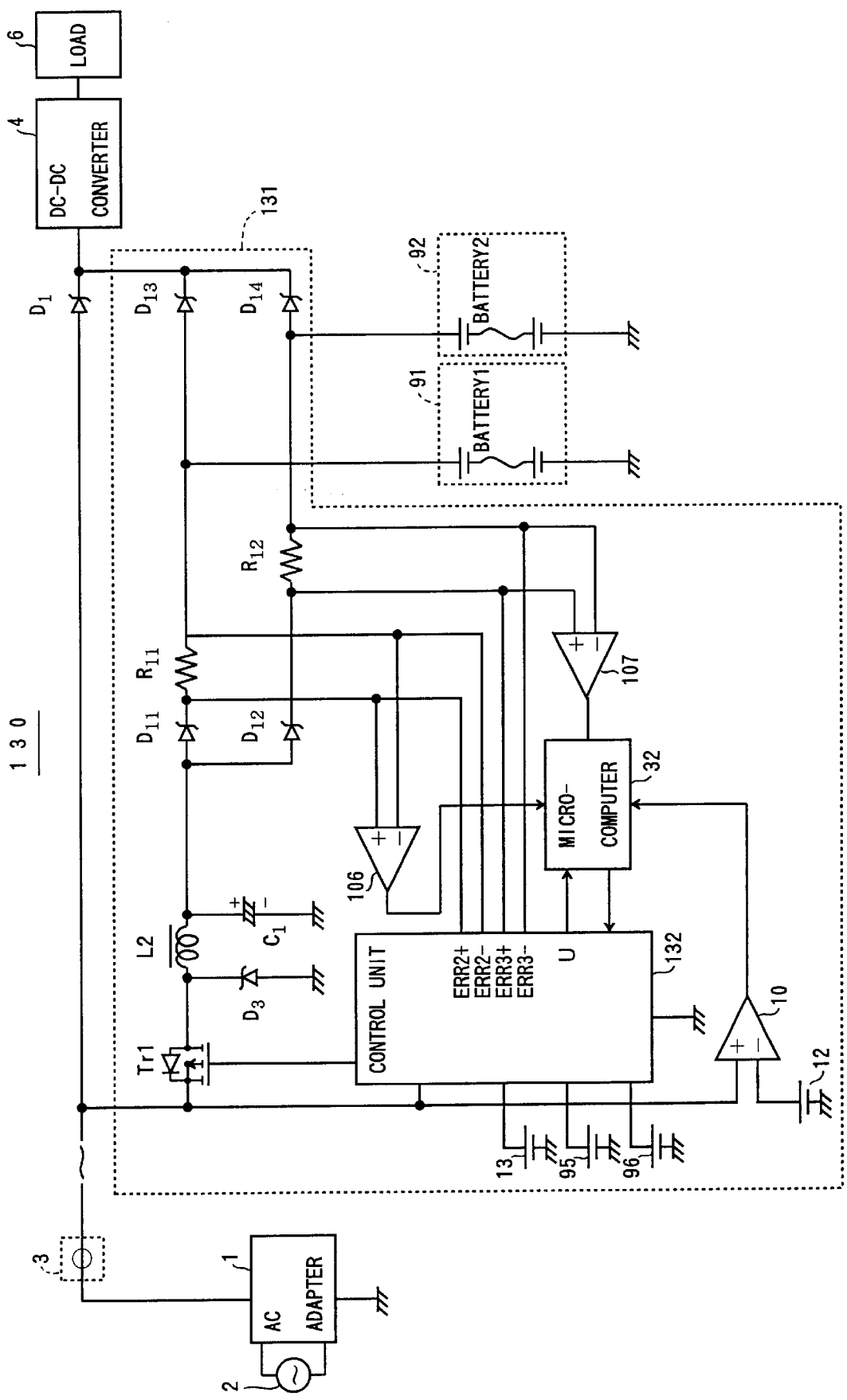
FIG. 19 is a block diagram of a fourth embodiment of the power supply unit of the present invention.

FIG. 19 is a block diagram of a fourth embodiment of the power supply unit of the present invention. In this figure, the same components as in FIG. 15 are denoted by the same reference numerals.

A power supply unit 130 of this embodiment does not have the resistor R1 for detecting the output current of the AC adapter 1, and a charger circuit of this power supply unit 130 has a different structure from the charger circuit 93 of the third embodiment. In this embodiment, the output current of the AC adapter 1 is supplied to the DC/DC converter 4 via the diode D1.

A control unit 132 of the charger circuit 131 has a different structure from the control unit 94 of the third embodiment. The control unit 132 detects the output voltage of the AC adapter 1 and the charging current and the charging voltage for the batteries. The control unit 132 then controls the switching transistor Tr1 with the detected output voltage, and the charging current and voltage for the batteries.

Figure 20:
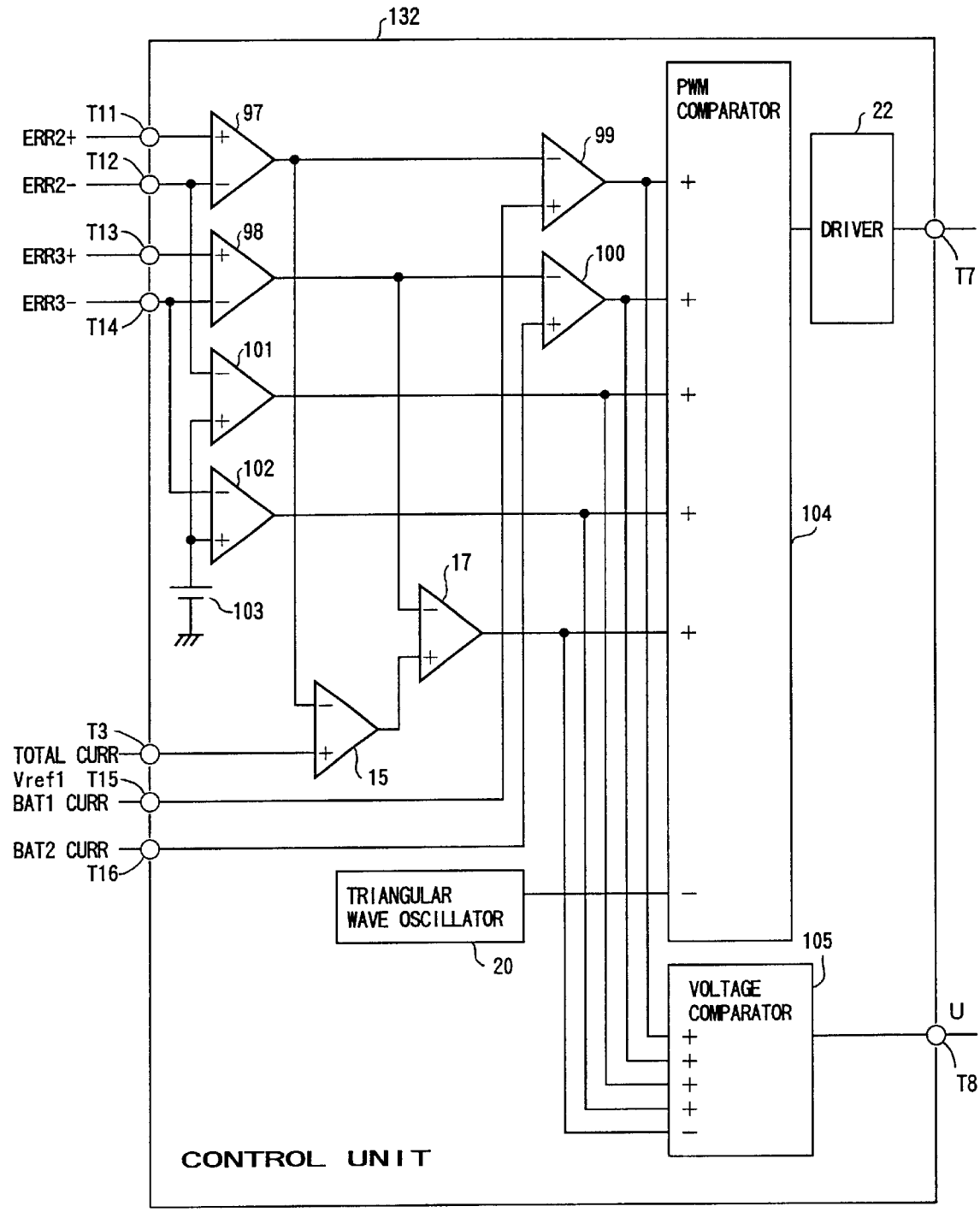
FIG. 20 is a block diagram of a control unit of the fourth embodiment of the present invention.

FIG. 20 is a block diagram of the control unit of the fourth embodiment of the present invention. In this figure, the same components as in FIG. 16 are denoted by the same reference numerals.

The control unit 132 of this embodiment comprises the differential amplifiers 15, 97, and 98, the error amplifiers 17, 99, 100, 101, and 102, the triangular wave oscillator 20, the driver 22, the PWM comparator 104, and the voltage comparator 105.

A reference voltage generated from the reference voltage supply 13 is supplied to the input terminal T3. The input terminal T3 is connected to the non-inverting input terminal of the differential amplifier 15. The output of the differential amplifier 97 is supplied to the inverting input terminal of the differential amplifier 15.

The differential amplifier 15 outputs a differential signal of the reference voltage generated from the reference voltage supply 13 and the output of the differential amplifier 97. Accordingly, the output of the differential amplifier 15 corresponds to the difference between the current supply capacity of the AC adapter 1 and the charging current for the battery 91.

The output of the differential amplifier 15 is supplied to the non-inverting input terminal of the error amplifier 17. The output of the differential amplifier 98 is supplied to the inverting input terminal of the error amplifier 17. The error amplifier 17 then outputs a differential signal of the output of the differential amplifier 15 and the output of the differential amplifier 98. The output of the error amplifier 17 corresponds to the difference between the charging current for the battery 92 and the difference between the current supply capacity of the AC adapter 1 and the charging current for the battery 91. The output of the error amplifier 17 is supplied to one of the non-inverting input terminals of the PWM comparator 104 and the inverting input terminal of the voltage comparator 105.

The outputs of the error amplifiers 99 to 102 are differences between the required charging currents and voltages and the actual charging currents and voltages for the batteries 91 and 92. Accordingly, as the amount of output current supplied from the AC adapter 1 to the load 6 increases and the charging currents for the batteries 91 and 92 decrease, the outputs of the error amplifiers 99 to 102 become large. When the outputs of the error amplifiers 99 to 102 become larger than the output of the error amplifier 17, it is determined that the current of the AC adapter 1 is restricted, and the output of the voltage comparator 105 becomes high.

The output of the voltage comparator 105 is supplied to the microcomputer 32, which in turn perform the procedures shown in FIG. 8, thereby preventing the control unit 132 from being stopped due to the restriction on current of the adapter 1.

In this embodiment, the voltage comparator 105 compares the outputs of the error amplifiers 99 to 102 with the output of the error amplifier 17. However, it is also possible to compare the outputs of the error amplifiers 99 to 102 with a predetermined reference voltage.

Figure 21:
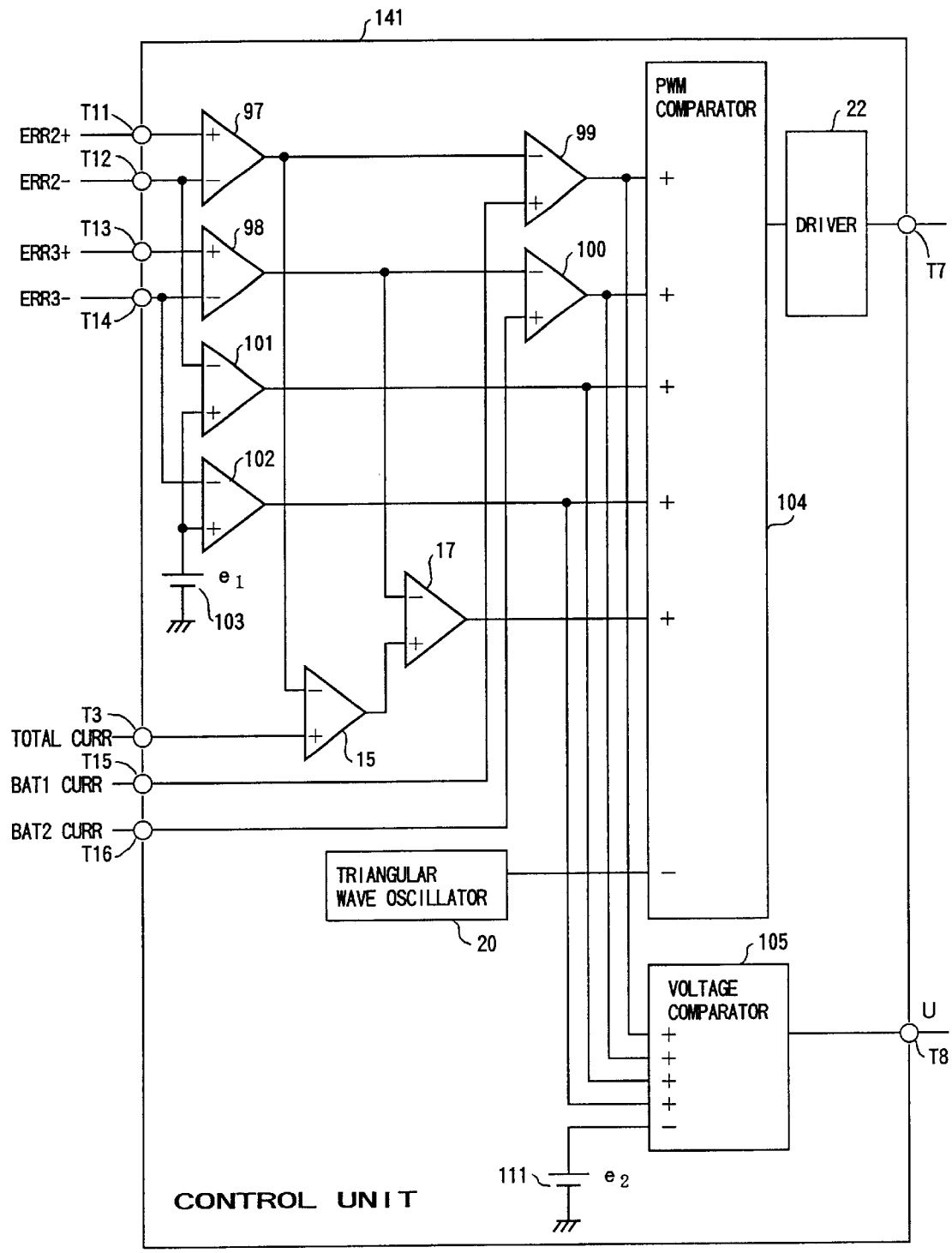
FIG. 21 is a block diagram of a first modification of the control unit of the fourth embodiment of the present invention.

FIG. 21 is a block diagram of a first modification of the control unit of the fourth embodiment of the present invention. In this figure, the same components as in FIG. 20 are denoted by the same reference numerals.

In a modified control unit 141, the reference voltage supply 111, instead of the output of the error amplifier 17, is connected to the inverting input terminal of the voltage comparator 105. The voltage comparator 105 outputs a signal through the output terminal T8. The output signal of the voltage comparator 105 is low when the outputs of the error amplifiers 99 to 102 are all lower than the reference voltage generated from the reference voltage supply 111. The output signal of the voltage comparator 105 is high when any of the outputs of the error amplifiers 99 to 102 is higher than the reference voltage generated from the reference voltage supply 111.

When the outputs of the error amplifiers 99 to 102 are all lower than the reference voltage Vref11 generated from the reference voltage supply 111, it is determined that a normal operation is being carried out. When any of the outputs of the error amplifiers 99 to 102 is higher than the reference voltage Vref11 generated from the reference voltage supply 111, it is determined that the output current of the AC adapter 1 is restricted.

The output of the voltage comparator 105 is supplied to the microcomputer 32, which in turn performs the procedures shown in FIG. 8, so that the control unit 141 can be prevented from being stopped due to the restricted current of the AC adapter 1.

In this modification, the voltage comparator 105 compares the outputs of the error amplifiers 99 to 102 with the reference voltage Vref11 generated from the reference voltage supply 111. However, it is also possible to compare the output of the error amplifier 17 with a predetermined reference voltage.

Figure 22:
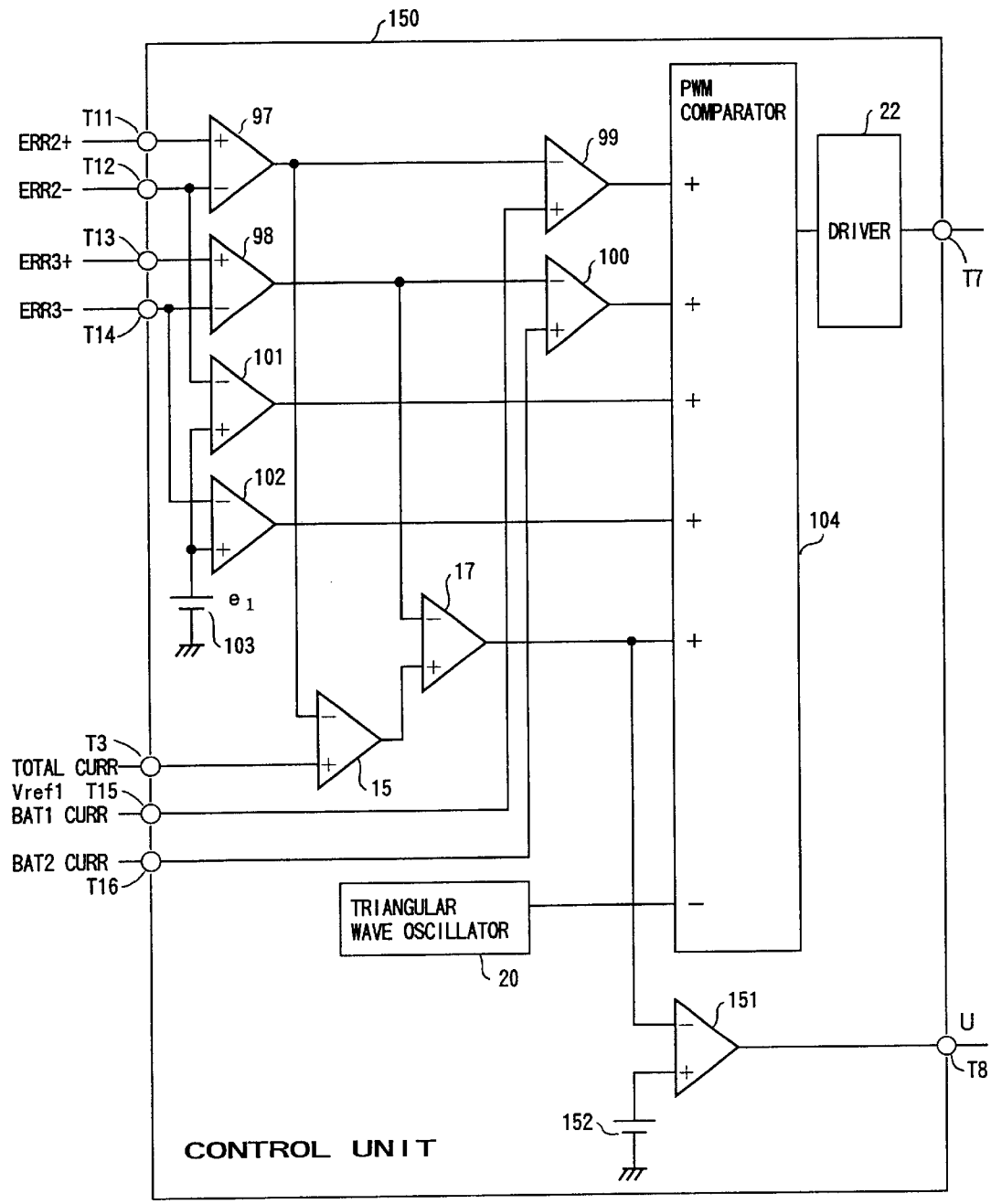
FIG. 22 is a block diagram of a second modification of the control unit of the fourth embodiment of the present invention.

FIG. 22 is a block diagram of a second modification of the control unit of the fourth embodiment of the present invention. In this figure, the same components as in FIG. 21 are denoted by the same reference numerals.

A modified control unit 150 has a two-input voltage comparator 151 in place of the voltage comparator 105. The output of the error amplifier 17 is supplied to the inverting terminal of the voltage comparator 151, while a reference voltage supply 152 is connected to the non-inverting input terminal of the voltage comparator 151.

The voltage comparator 151 outputs a signal through the output terminal T8. The output signal of the voltage comparator 151 is low when the output of the error amplifier 17 is lower than a reference voltage Vref15 generated from the reference voltage supply 152. The output signal of the voltage comparator 151 is high when the output of the error amplifier 17 is higher than the reference voltage Vref15 generated from the reference voltage supply 152.

When the output of the error amplifier 17 is lower than the reference voltage Vref15 generated from the reference voltage supply 152, it is determined that a normal operation is being carried out. When the output of the error amplifier 17 is higher than the reference voltage Vref15 generated from the reference voltage supply 152, it is determined that the output current of the AC adapter 1 is restricted, i.e., that the power supply capacity of the AC adapter 1 is restricted.

The output of the voltage comparator 151 is then supplied to the microcomputer 32, which in turn performs the procedures shown in FIG. 8, so that the control unit 150 can be prevented from being wrongly stopped due to the restricted current of the AC adapter 1.

In this embodiment, the signal representing the restricted current of the AC adapter 1 is detected from the charging currents for the batteries 91 and 92. However, it is also possible to output a signal in accordance with each of the charging currents for the batteries 91 and 92.

Figure 23:
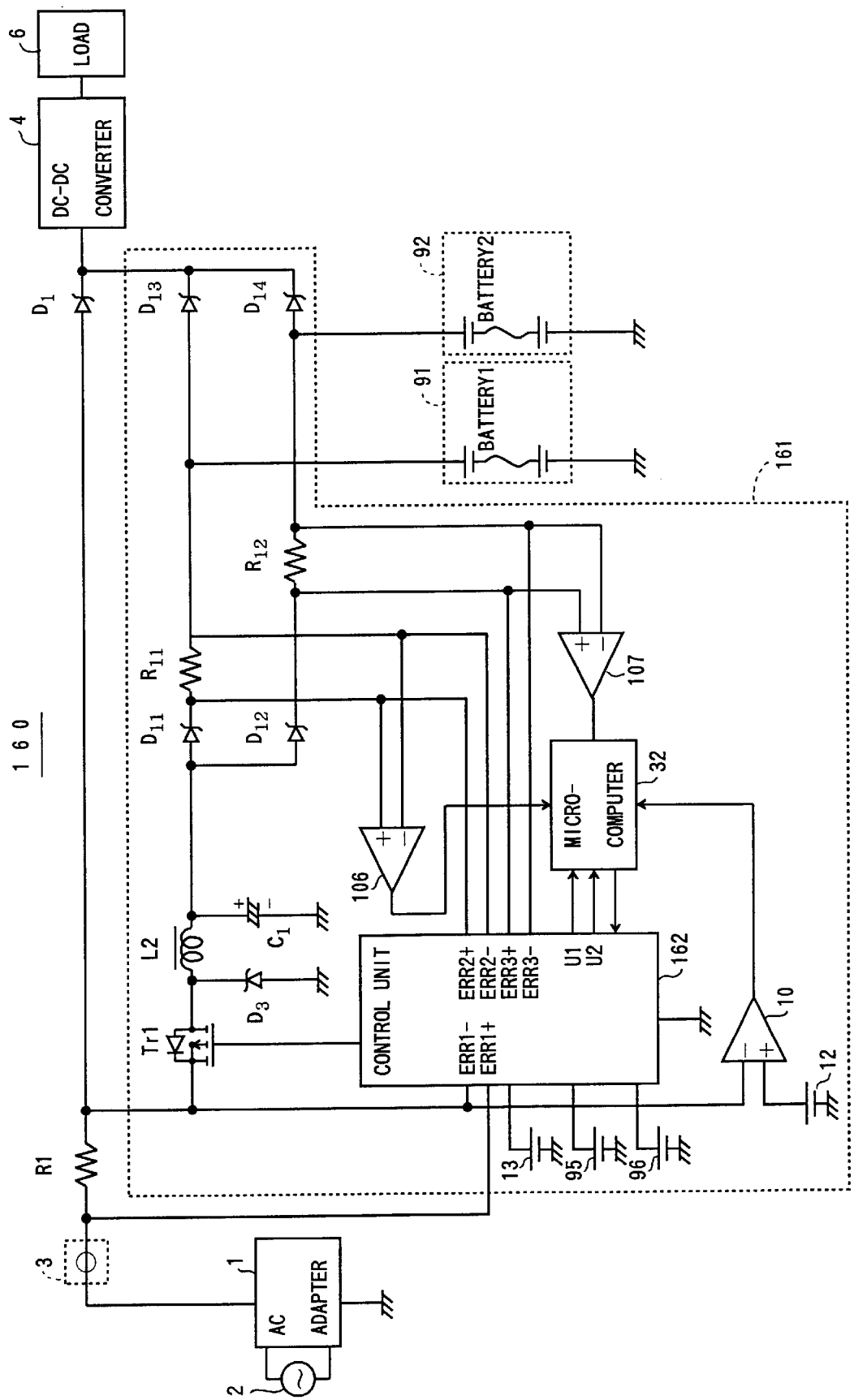
FIG. 23 is a block diagram of a fifth embodiment of the power supply unit of the present invention.

FIG. 23 is a block diagram of a fifth embodiment of the power supply unit of the present invention. In this figure, the same components as in FIG. 15 are denoted by the same reference numerals.

A power supply unit 160 of this embodiment has a charger circuit 161 whose structure is different from the charger circuit 93 of the third embodiment. In the charger circuit 161, the structure of a control unit 162 and the operation of a microcomputer 163 are different from those of the third embodiment.

Figure 24:
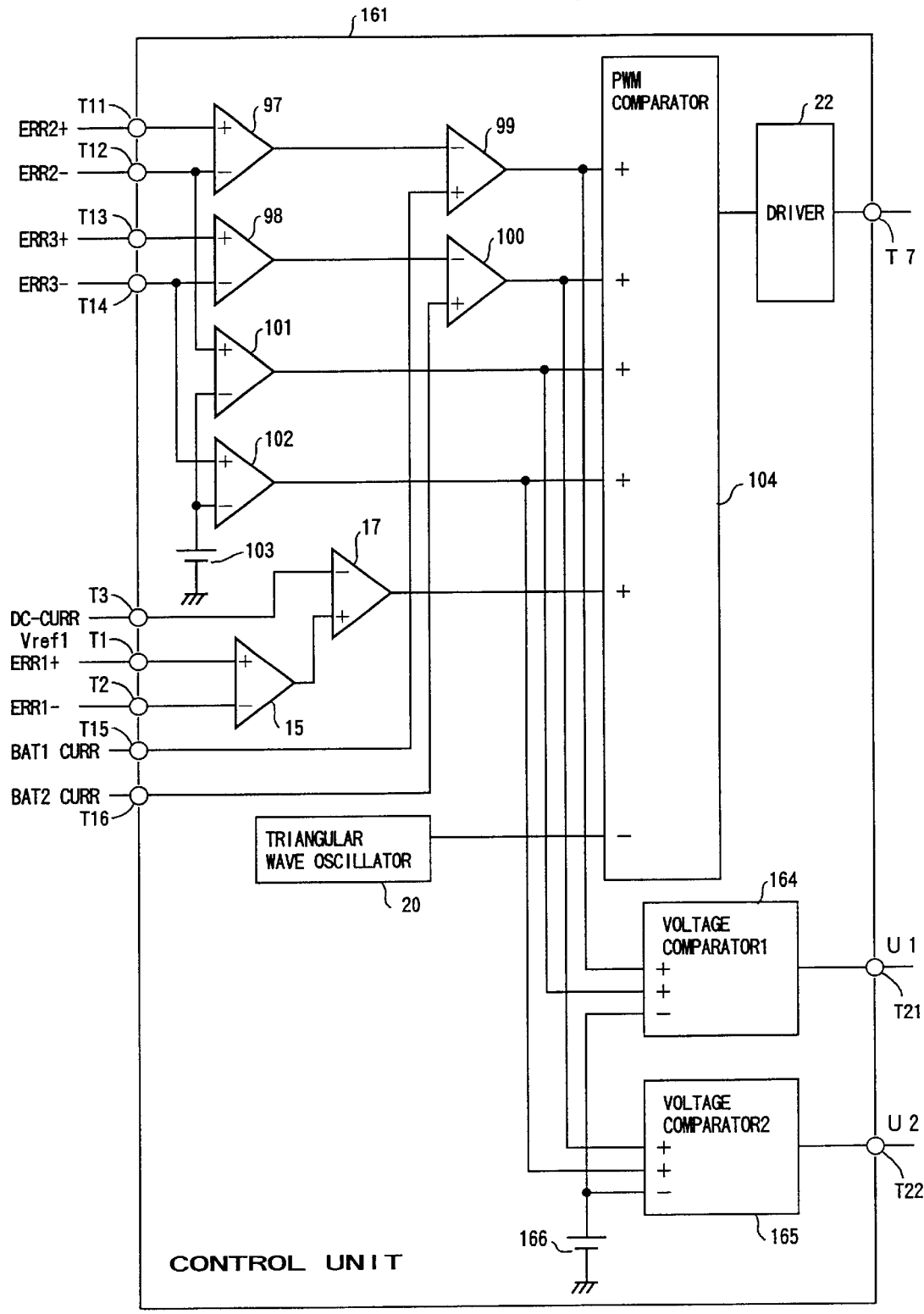
FIG. 24 is a block diagram of a control unit of the fifth embodiment of the present invention.

FIG. 24 is a block diagram of the control unit of the fifth embodiment of the present invention. The control unit 161 of this embodiment comprises three-input voltage comparators 164 and 165 and a reference voltage supply 166. The outputs of the error amplifiers 99 and 101 are supplied to the two non-inverting input terminals of the voltage comparator 164, while the reference voltage supply 166 is connected to the inverting input terminal of the voltage comparator 164. The voltage comparator 164 compares the outputs of the error amplifiers 99 and 101 with the reference voltage Vref16 generated from the reference voltage supply 166, and outputs a signal as a comparison result. The output signal of the voltage comparator 164 is low when the outputs of the error amplifiers 99 and 101 are both lower than the reference voltage Vref16 generated from the reference voltage supply 16. The output signal of the voltage comparator 164 is high when either of the outputs of the error amplifiers 99 and 101 is higher than the reference voltage Vref16 generated from the reference voltage supply 166.

Meanwhile, the outputs of the error amplifiers 100 and 102 are supplied to the two non-inverting input terminals of the voltage comparator 165, and the reference voltage supply 166 is connected to the inverting input terminal of the voltage comparator 165. The voltage comparator 165 compares the outputs of the error amplifiers 100 and 102 with the reference voltage Vref16 generated from the reference voltage supply 166, and outputs a signal as a comparison result. The output signal of the voltage comparator 165 is low when the outputs of the error amplifiers 100 and 102 are both lower than the reference voltage Vref16 generated from the reference voltage supply 166. The outputs signal of the voltage comparator 165 is high when either of the outputs of the error amplifiers 100 and 102 is higher than the reference voltage Vref16 generated from the reference voltage supply 166.

In the above manner, the current restricted state of the AC adapter 1 can be detected from either the charging current and voltage for the battery 91 or the charging current and voltage for the battery 92. The charger circuit 161 of this embodiment performs PWM control in accordance with the output current of the AC adapter 1. However, this PWM control can be performed in accordance with the charging currents and the charging voltages for the batteries 91 and 92.

Figure 25:
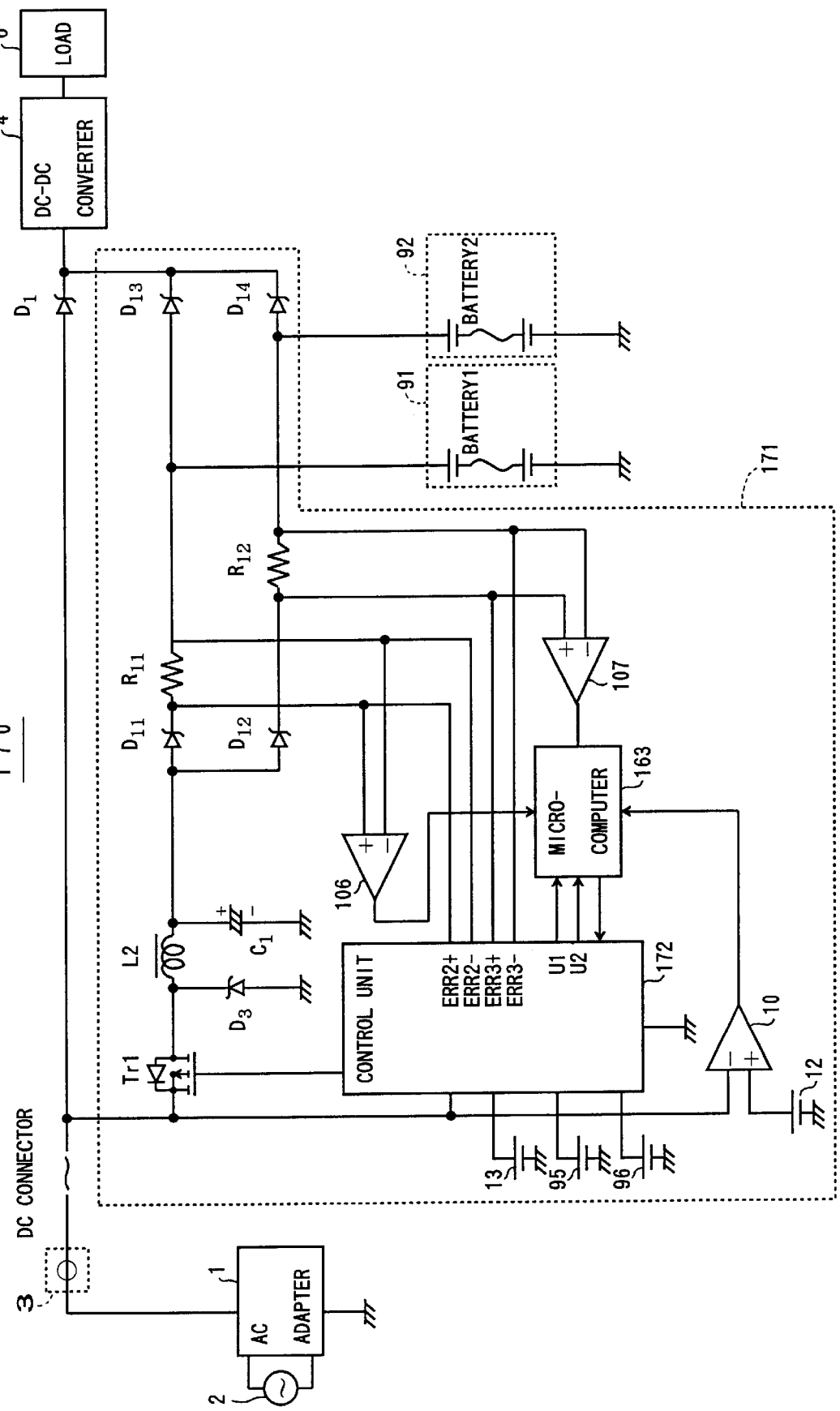
FIG. 25 is a block diagram of a sixth embodiment of the power supply unit of the present invention.

FIG. 25 is a block diagram of a sixth embodiment of the power supply unit of the present invention. In this figure, the same components as in FIG. 23 are denoted by the same reference numerals.

A power supply unit 170 of this embodiment has a control unit 172 in a charger circuit 171. The structure of the control unit 172 is different from the control unit 162 shown in FIG. 23.

Figure 26:
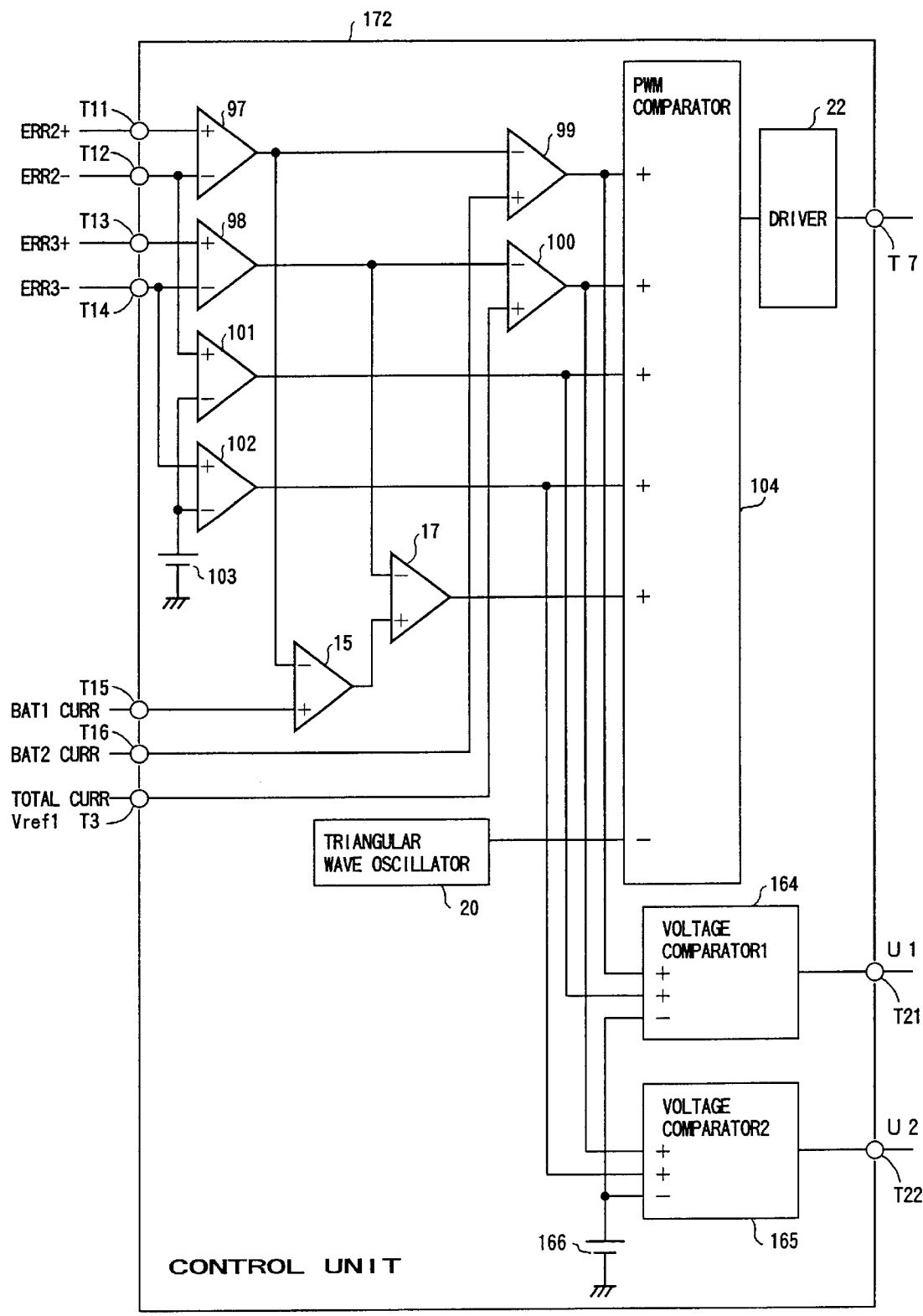
FIG. 26 is a block diagram of a control unit of the sixth embodiment of the present invention.

FIG. 26 is a block diagram of the control unit of the sixth embodiment of the present invention. In this figure, the same components as in FIG. 24 are denoted by the same reference numerals. In this embodiment, the error amplifiers 15 and 17 detect the differences between the current supply capacity of the AC adapter 1 and the charging currents for the batteries 91 and 92. The PWM control is then performed in accordance with the detected differences.

In the first to sixth embodiments, the PWM control is performed on the charging current. However, it is also possible to employ other methods, such as a synchronous commutation technique.

The present invention is not limited to the specifically disclosed embodiments, but variations and modifications may be made without departing from the scope of the present invention.

The present application is based on Japanese priority application No. 11-103159, filed on Apr. 6, 1999, the entire contents of which are hereby incorporated by reference.

What is claimed is:

1. A battery charge control circuit which controls a charging current for charging a battery part, comprising:
a restriction notifying unit which detects a restriction on the supply capacity of a power source, and outputs a notification that the supply capacity of the power source is restricted.

2. The battery charge control circuit as claimed in claim 1, further comprising:
a first control circuit which controls the charging current for the battery part, so that the battery part can be charged in accordance with predetermined charging conditions; and
a second control circuit which controls the charging current so that the power supplied from the power source does not exceed the supply capacity,
wherein the restriction notifying unit notifies that the charging current is controlled by the second control circuit.

3. The battery charge control circuit as claimed in claim 1, wherein the power source charges the battery part and supplies power to a load.

4. The battery charge control circuit as claimed in claim 1, wherein the battery part includes a plurality of batteries connected in parallel.

5. The battery charge control circuit as claimed in claim 1, wherein the restriction notifying unit detects the charging current for charging the battery part and, in accordance with the charging current, outputs a notification that the supply capacity of the power source is restricted.

6. The battery charge control circuit as claimed in claim 5, wherein the restriction notification unit detects the charging current for charging the battery part and, in accordance with the difference between the charging current for the battery part and a current demanded by the battery part, outputs the notification that the supply capacity of the power source is restricted.

7. The battery charge control circuit as claimed in claim 1, wherein the restricted notifying unit detects a charging voltage of the battery part and, in accordance with the charging voltage, outputs a notification that the supply capacity of the power source is restricted.

8. The battery charge control circuit as claimed in claim 7, wherein the restriction notifying unit detects the charging voltage of the battery part and, in accordance with a difference between the charging voltage of the battery part and a voltage demanded by the battery part, outputs the notification that the supply capacity of the power source is restricted.

9. The battery charge control circuit as claimed in claim 1, wherein the restriction notifying unit detects an output current of the power source and, in accordance with the detected output current of the power source, outputs a notification that the supply capacity of the power source is restricted.

10. The battery charge control circuit as claimed in claim 9, wherein the restriction notifying unit detects the output current of the power source and, in accordance with a difference between the output current of the power source and the maximum current that can be supplied from the power source, outputs the notification that the supply capacity of the power source is restricted.

11. The battery charge control circuit as claimed in claim 1, wherein the restriction notifying unit detects an output voltage of the power source and, in accordance with the output voltage of the power source, outputs a notification that the supply capacity of the power source is restricted.

12. The battery charge control circuit as claimed in claim 11, wherein the restriction notifying unit detects the output voltage of the power source and, in accordance with the difference between the output voltage of the power source and a predetermined reference voltage, outputs the notification that the supply capacity of the power source is restricted.

13. The battery charge control circuit as claimed in claim 1, wherein the notification outputted from the restriction notifying unit is that the current supply capacity of the power source is restricted.

14. The battery charge control circuit as claimed in claim 1, wherein the notification outputted from the restriction notifying unit is that the power supply capacity of the power source is restricted.

15. A battery charge control circuit comprising:
   a first control circuit which controls a current supplied from a power source so that a battery part is charged at a constant current and/or a constant voltage;
   a second control circuit which controls a charging current for the battery part in accordance with an output of the power source; and
   a determination unit which determines whether the charging current for the battery part is controlled by the second control circuit.

16. The battery charge control circuit as claimed in claim 15, wherein the determination unit determines whether the charging current for the battery part is controlled by the first control circuit or the second control circuit.

17. The battery charge control circuit as claimed in claim 15, further comprising a determination result output unit which outputs a determination result of the determination unit.

18. A battery charge control circuit comprising:
   a first control circuit which controls a current supplied from a power source so that a plurality of batteries are charged at a constant current and/or a constant voltage;
   a second control circuit which controls charging currents for the plurality of batteries in accordance with an output of the power source; and
   a determination unit which determines whether the charging currents for the plurality of batteries are controlled by the second control circuit.

19. The battery charge control circuit as claimed in claim 18, wherein the first control circuit controls the charging currents and/or voltages so that the charging current for the plurality of batteries are regulated when voltages of the plurality of batteries are lower than a predetermined reference voltage, and the charging voltage for the plurality of batteries are regulated when the voltages of the plurality of batteries are higher than the predetermined reference voltage.

20. A battery charge control circuit which controls a charging current for charging a battery part, said circuit comprising:
   a first control circuit which controls the charging current for the battery part so that the battery can be charged in accordance with predetermined charging conditions;
   a second control circuit which controls the charging current for the battery part so that power supplied from a power source does not exceed a predetermined capacity; and
   a determination unit which determines whether the charging current for the battery part is controlled by the second control circuit.

21. The battery charge control circuit as claimed in claim 20, wherein the determination unit determines whether the charging current for the battery part is controlled by the first control circuit or the second control circuit.

22. The battery charge control circuit as claimed in claim 20, wherein the charging conditions include charging the battery part at a constant current.

23. The battery charge control circuit as claimed in claim 20, wherein the charging conditions include charging the battery part at a constant voltage.

24. The battery charge control circuit as claimed in claim 20, further comprising:
   a detecting unit which detects a charged state of the battery part; and
   a completion determination unit which determines whether the charging of the battery part is completed from a determination result of the determination unit and a detection result of the detecting unit.

25. The battery charge control circuit as claimed in claim 20, wherein the power source is connected to a plurality of batteries, each of which is provided with the first control circuit.

26. A battery charge control circuit which controls a charging current so that a power source supplies power to both a battery part and a load, comprising:
   a first control circuit which controls the charging current for the battery part so that the battery part is charged in accordance with predetermined charging conditions;
   a second control circuit which controls the charging current so that power supplied from the power source does not exceed a predetermined capacity; and
   a determination unit which determines whether the charging current for the battery part is controlled by the second control circuit.

27. The battery charge control circuit as claimed in claim 26, wherein the determination unit determines whether the charging current for the battery part is control by the first control circuit or the second control circuit.

28. The battery charge control circuit as claimed in claim 26, wherein the charging conditions include charging the battery part at a constant current.

29. The battery charge control circuit as claimed in claim 26, wherein the charging conditions include charging the battery part at a constant voltage.

30. The battery charge control circuit as claimed in claim 26, further comprising:

a detecting unit which detects a charged state of the battery part; and a completion determination unit which determines whether the charging of the battery unit is completed from a determination result of the determination unit and a detection result of the detecting unit.

31. The battery charge control circuit as claimed in claim 26, wherein the power source is connected to a plurality of batteries, each of which is provided with the first control circuit.

32. A battery charging device for charging a battery part with power supplied from a power source, comprising a restricted state notifying unit which detects a restriction on a supply capacity of the power source, and outputs a notification that the supply capacity of the power source is restricted.

33. The battery charging device as claimed in claim 32, further comprising:

a first control circuit which controls a charging current for the battery part so that the battery part is charged in accordance with predetermined charging conditions; and a second control circuit which controls the charging current for the battery part so that power supplied from the power source does not exceed a capacity;

wherein the restricted state notifying unit notifies that the charging current is controlled by the second control circuit.

34. The battery charging device as claimed in claim 32, wherein the power source supplies power to both the battery part and a load.

35. The battery charging device as claimed in claim 32, wherein the battery part includes a plurality of batteries connected in parallel.

36. A battery charging device which is connected to a power source for supplying a current to a load, and is connected to a battery part to be charged with power from the power source, said battery charging device comprising:

a current control unit which controls a current supplied from the power source to the battery part;

a control unit which detects a charged state of the battery part and controls the current control unit; and a restricted state notifying unit which outputs a notification that a supply capacity of the power source is restricted.

37. The battery charging device as claimed in claim 36, wherein the battery part includes a plurality of batteries connected in parallel.

38. The battery charging device as claimed in claim 36, wherein the restricted state notifying unit detects the charging current for the battery part, and, in accordance with the charging current for the battery part, outputs the notification that the supply capacity of the power source is restricted.

39. The battery charging device as claimed in claim 38, wherein the restricted state notifying unit detects the charging current for the battery part, and, in accordance with a difference between the charging current for the battery part and a current demanded by the battery pack, outputs the notification that the supply capacity of the power source is restricted.

40. The battery charging device as claimed in claim 36, wherein the restricted state notifying unit detects a charging voltage for the battery part, and, in accordance with the charging voltage, outputs the notification that the supply capacity of the power source is restricted.

41. The battery charging device as claimed in claim 40, wherein the restricted state notifying unit detects the charging voltage for the battery part, and, in accordance with a difference between the voltage for the battery part and a voltage demanded by the battery part, outputs the notification that the supply power of the power source is restricted.

42. The battery charging device as claimed in claim 36, wherein the restricted state notifying unit detects an output current of the power source, and, in accordance with the output current of the power source, outputs the notification that the supply capacity of the power source is restricted.

43. The battery charging device as claimed in claim 42, wherein the restricted state notifying unit detects the output current of the power source, and, in accordance with a difference between the output current of the power source and a maximum current supplied from the power source, outputs the notification that the supply capacity of the power source is restricted.

44. The battery charging device as claimed in claim 36, wherein the restricted state notifying unit detects an output voltage of the power source, and, in accordance with the output voltage of the power source, outputs the notification that the supply capacity of the power source is restricted.

45. The battery charging device as claimed in claim 44, wherein the restricted state notifying unit detects the output voltage of the power source, and, in accordance with a difference between the output voltage of the power source and a predetermined reference voltage, outputs the notification that the supply capacity of the power source is restricted.

46. A battery charging device comprising:

a first control circuit which controls a current supplied from a power source so that a plurality of batteries are charged at a constant current and/or a constant voltage;

a second control circuit which controls charging currents for the plurality of batteries in accordance with an output of the power source; and a determination unit which determines whether the charging currents for the plurality of batteries are controlled by the second control circuit.

47. The battery charging device as claimed in claim 46, wherein the first control circuit controls the current so that the plurality of batteries are charged at the constant current and/or the constant voltage.

48. A battery charging device which controls a charging current supplied from a power source to a battery part, said battery charging device comprising:

a first control circuit which controls the charging current for the battery part so that the battery part is charged in accordance with predetermined charging conditions;

a second control circuit which controls the charging current so that power supplied from the power source does not exceed a predetermined capacity; and a determination unit which determines whether the charging current for the battery part is controlled by the second control circuit.

49. The battery charging device as claimed in claim 48, wherein the determination unit determines whether the charging current for the battery part is controlled by the first control circuit or the second control circuit.

50. The battery charging device as claimed in claim 48, wherein the charging conditions include charging the battery part at a constant current.

51. The battery charging device as claimed in claim 48, wherein the charging conditions include charging the battery part at a constant voltage.

52. The battery charging device as claimed in claim 48, further comprising:

a detecting unit which detects a charged state of the battery part; and a completion determination unit which determines whether the charging of the battery unit is completed from a determination result of the determination unit and a detection result of the detecting unit.

53. The battery charging device as claimed in claim 48, wherein the power source is connected to a plurality of batteries, each of which is provided with the first control circuit.

54. A battery charging device which controls a charging current so that a power source supplies power to both a battery part and a load at the same time, comprising:
   a first control circuit which controls the charging current for the battery part so that the battery part is charged in accordance with predetermined charging conditions;
   a second control circuit which controls the charging current so that power supplied from the power source does not exceed a predetermined capacity; and
   a determination unit which determines whether the charging current for the battery part is controlled by the second control circuit.

55. The battery charging device as claimed in claim 54, wherein the determination unit determines whether the charging current for the battery part is controlled by the first control circuit or the second control circuit.

56. The battery charging device as claimed in claim 54, wherein the charging conditions include charging the battery part at a constant current.

57. The battery charging device as claimed in claim 54, wherein the charging conditions include charging the battery part at a constant voltage.

58. The battery charging device as claimed in claim 54, further comprising:
   a detecting unit which detects a charged state of the battery part; and
   a completion determining unit which determines whether the charging of the battery unit is completed from a determination result of the determination unit and a detection result of the detecting unit.

59. The battery charging device as claimed in claim 54, wherein the power source is connected to a plurality of batteries, each of which is provided with the first control circuit.

60. A battery charge control method, comprising the steps of:
   detecting a restriction on a supply capacity of a power source which supplies current to a load and charges a battery part; and
   continuing the charging of the battery part when the supply capacity of the power source is restricted.

61. The battery charge control method as claimed in claim 60, wherein the battery part includes a plurality of batteries connected in parallel.

62. A battery charge control method, comprising the steps of:
   charging a battery part at a constant current and/or a constant voltage obtained from a current supplied from a power source;
   controlling a charging current for the battery part in accordance with an output of the power source; and
   determining whether the charging current for the battery part is controlled in accordance with the output of the power source.

63. The battery charge control method as claimed in claim 62, wherein the determination result is outputted to the outside.

64. A battery charge control method, comprising the steps of:
   charging a plurality of batteries connected in parallel by a current having a constant current level and/or a constant voltage and supplied from a power source;
   controlling charging currents for the plurality of batteries in accordance with an output of the power source; and
   determining whether the charging currents for the plurality of batteries are controlled in accordance with the output of the power source.

65. The battery charge control method as claimed in claim 64, wherein whether the charging current for each of the plurality of batteries is controlled is determined in accordance with an output current of the power source.

66. A battery charge control method, comprising the steps of:
   detecting a restriction on a supply capacity of a power source;
   outputting a notification, in accordance with a detected result, that the supply capacity of the power source is restricted;
   a charging current for a battery part is controlled in accordance with the notification.

67. A battery charge control method, comprising the steps of:
   controlling a current supplied from a power source so that a battery part is charged at a constant current and/or a constant voltage;
   controlling a charging current for the battery part in accordance with an output of the power source; and
   determining whether the charging current for the battery part is controlled in the step of controlling the charging current.

68. A battery charge control method, comprising the steps of:
   controlling a current supplied from a power source so that a plurality of batteries are charged at a constant current and/or a constant voltage;
   controlling charging currents for the plurality of batteries in accordance with an output of the power source; and
   determining whether the charging currents for the plurality of batteries are controlled in the step of controlling the charging currents.

69. A battery charge control method for controlling a charging current supplied from a power source to a battery part, comprising the steps of:
   controlling the charging current for the battery part so that the battery part is charged in accordance with predetermined charging conditions;
   controlling the charging current so that power supplied from the power source does not exceed a predetermined capacity; and
   determining whether the charging current for the battery part is controlled in the second step of controlling the charging current.

70. A battery charge control method for controlling a charging current so that a power source supplies power to a battery part and a load at the same time, said method comprising the steps of:
   controlling a charging current for the battery part so that the battery part is charged in accordance with predetermined charging conditions;
   controlling the charging current so that power supplied form the power source does not exceed a predetermined capacity; and
   determining whether the charging current of the battery part is controlled in the second step of controlling the charging current.

* * * * *

UNITED STATES PATENT AND TRADEMARK OFFICE
CERTIFICATE OF CORRECTION

PATENT NO.    : 6,452,364 B1
DATED         : September 17, 2002
INVENTOR(S)   : Mitsuo Saeki et al.

It is certified that error appears in the above-identified patent and that said Letters Patent is hereby corrected as shown below:

Column 24,
Line 58, change "control" to -- controlled --.

Signed and Sealed this

Eighteenth Day of February, 2003

JAMES E. ROGAN
*Director of the United States Patent and Trademark Office*